US012586127B2

(12) United States Patent　　　　(10) Patent No.:　US 12,586,127 B2

Sun et al.　　　　　　　　　　　　　(45) Date of Patent:　　Mar. 24, 2026

(54) STOCHASTIC BIDDING STRATEGY FOR VIRTUAL POWER PLANTS WITH MOBILE ENERGY STORAGES

(71) Applicant: Mitsubishi Electric Research Laboratories, Inc., Cambridge, MA (US)

(72) Inventors: Hongbo Sun, Lexington, MA (US); Dongliang Xiao, Lincoln, NE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1077 days.

(21) Appl. No.: 16/822,592

(22) Filed: Mar. 18, 2020

(65) Prior Publication Data

US 2021/0304306 A1　　　Sep. 30, 2021

(51) Int. Cl.
　　　*G06Q 10/00*　　　(2023.01)
　　　*G06N 20/00*　　　(2019.01)
　　　(Continued)

(52) U.S. Cl.
　　　CPC ............. *G06Q 40/04* (2013.01); *G06N 20/00* (2019.01); *G06Q 10/04* (2013.01);
　　　(Continued)

(58) Field of Classification Search
　　　CPC .... G06Q 40/04; G06Q 10/04; G06Q 10/0635; G06Q 30/0205; G06Q 30/08;
　　　(Continued)

(56) References Cited

U.S. PATENT DOCUMENTS 7,599,866 B2 * 10/2009 Yan ...................... G06Q 20/102
　　　　　　　　　　　　　　　　　705/37
2012/0130556 A1 * 5/2012 Marhoefer ............. G05B 15/02
　　　　　　　　　　　　　　　　　700/291

(Continued)

OTHER PUBLICATIONS

Peyman Karimyan, "Stochastic approach to represent distributed energy resources in the form of a virtual power plant in energy and reserve markets", IET Generation, Transmission & Distribution (Year: 2016).*

(Continued)

*Primary Examiner* — Brian M Epstein

*Assistant Examiner* — Reham K Abouzahra

(74) *Attorney, Agent, or Firm* — Gene Vinokur

(57)　　　　　　ABSTRACT

Systems and methods for allocating energy including distributing and receiving energy using a mobile energy storage (MEES) system at locations of a power supplier in an energy market system by a user. Determine allocating amounts of energy for the MEES system and for each time interval for all time intervals for an upcoming operating time period based on a set of uncertain parameters using an optimization model. Base on calculating an objective function using uncertain parameters. Update the objective function using constraints. While optimizing the objective function for a value hierarchy associated with energy and reserve bidding scenarios for the user and delivery scheduling for the MEES system based upon the stored user risk preferences. Control scheduling of the MEES system between the locations of the power supplier, according to allocating of the amount of the electrical energy for the MEES system at the locations of the power supplier.

8 Claims, 20 Drawing Sheets

(51) Int. Cl.

| | |
|---|---|
| *G06Q 10/04* | (2023.01) |
| *G06Q 10/0631* | (2023.01) |
| *G06Q 30/0204* | (2023.01) |
| *G06Q 30/08* | (2012.01) |
| *G06Q 40/04* | (2012.01) |
| *G06Q 50/06* | (2012.01) |
| *H02J 3/008* | (2026.01) |
| *H02J 3/32* | (2006.01) |
| *H02J 3/38* | (2006.01) |

(52) U.S. Cl.
CPC . *G06Q 10/06314* (2013.01); *G06Q 10/06315* (2013.01); *G06Q 30/0205* (2013.01); *G06Q 30/08* (2013.01); *G06Q 50/06* (2013.01); *H02J 3/008* (2013.01); *H02J 3/32* (2013.01); *H02J 3/381* (2013.01); *H02J 2203/20* (2020.01); *H02J 2300/20* (2020.01)

(58) Field of Classification Search
CPC .. G06Q 50/06; H02J 3/008; H02J 3/32; H02J 3/381; H02J 2203/20; H02J 2300/20
USPC ......................................... 705/7.11
See application file for complete search history.

(56) References Cited

U.S. PATENT DOCUMENTS

| | | | | |
|---|---|---|---|---|
| 2013/0262197 | A1* | 10/2013 | Kaulgud | H02J 3/001 |
| | | | | 705/14.1 |
| 2017/0005515 | A1* | 1/2017 | Sanders | H02J 13/00002 |
| 2017/0220708 | A1* | 8/2017 | He | G01W 1/10 |
| 2019/0147551 | A1* | 5/2019 | Sun | H02J 3/008 |
| | | | | 700/291 |
| 2020/0387981 | A1* | 12/2020 | Tinio | H02J 3/381 |
| 2020/0409319 | A1* | 12/2020 | Ma | G06Q 50/06 |
| 2022/0156775 | A1* | 5/2022 | Price | H02J 3/003 |

OTHER PUBLICATIONS

Rinalini Lahon, "Risk-based coalition of cooperative microgrids in electricity market environment", ET Generation, Transmission & Distribution (Year: 2018).*

Duong Tung Nguyen and Long Bao Le, "Risk-Constrained Profit Maximization for Microgrid Aggregators with Demand Response", IEEE (Year: 2015).*

Sina Parhizi and Amin Khodae, "Market-based Microgrid Optimal Scheduling", IEEE (Year: 2016).*

\* cited by examiner

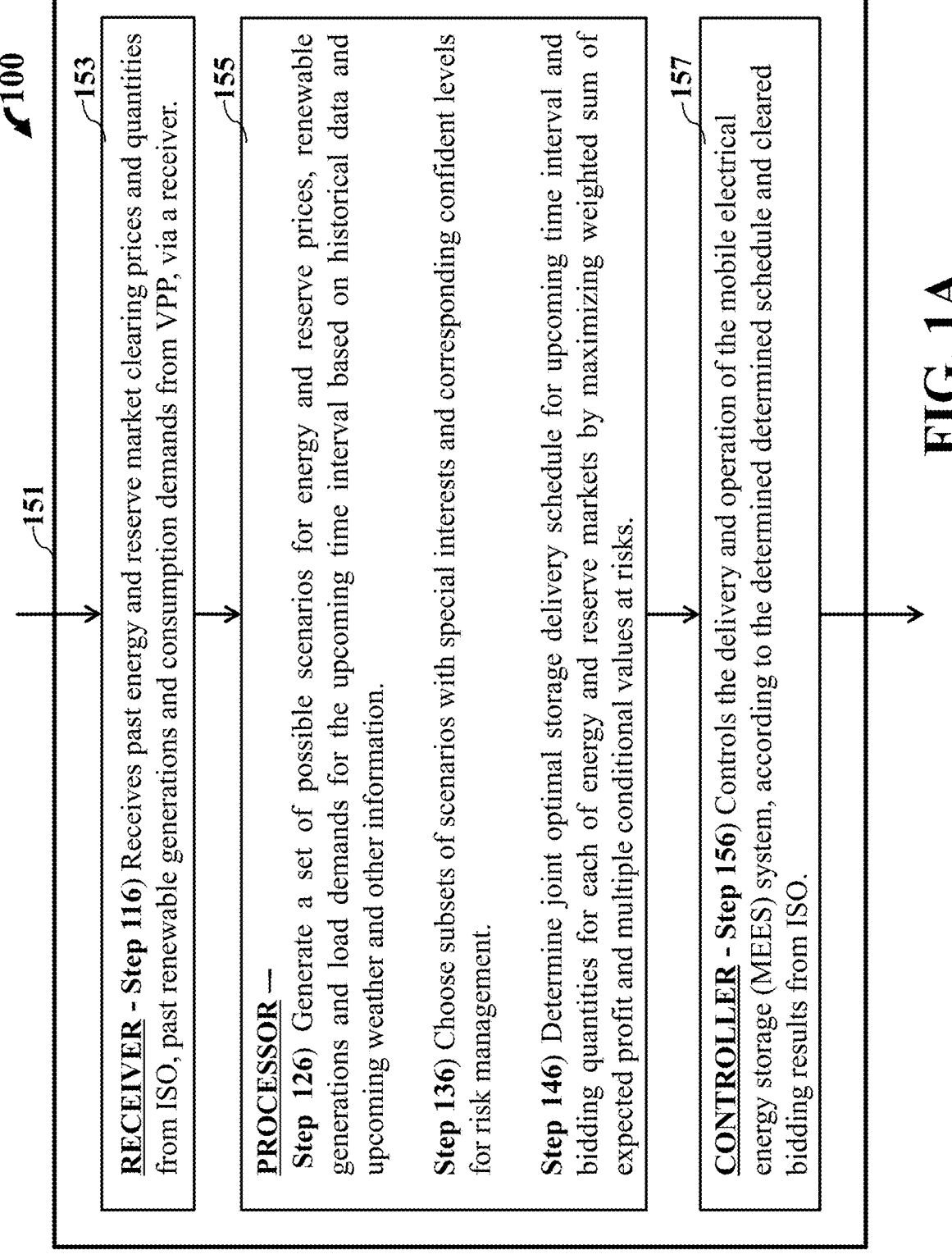

100

151

RECEIVER – Step 116) Receives past energy and reserve market clearing prices and quantities from ISO, past renewable generations and consumption demands from VPP, via a receiver.

153

PROCESSOR—

Step 126) Generate a set of possible scenarios for energy and reserve prices, renewable generations and load demands for the upcoming time interval based on historical data and upcoming weather and other information.

Step 136) Choose subsets of scenarios with special interests and corresponding confident levels for risk management.

Step 146) Determine joint optimal storage delivery schedule for upcoming time interval and bidding quantities for each of energy and reserve markets by maximizing weighted sum of expected profit and multiple conditional values at risks.

155

157

CONTROLLER – Step 156) Controls the delivery and operation of the mobile electrical energy storage (MEES) system, according to the determined determined schedule and cleared bidding results from ISO.

FIG. 1A

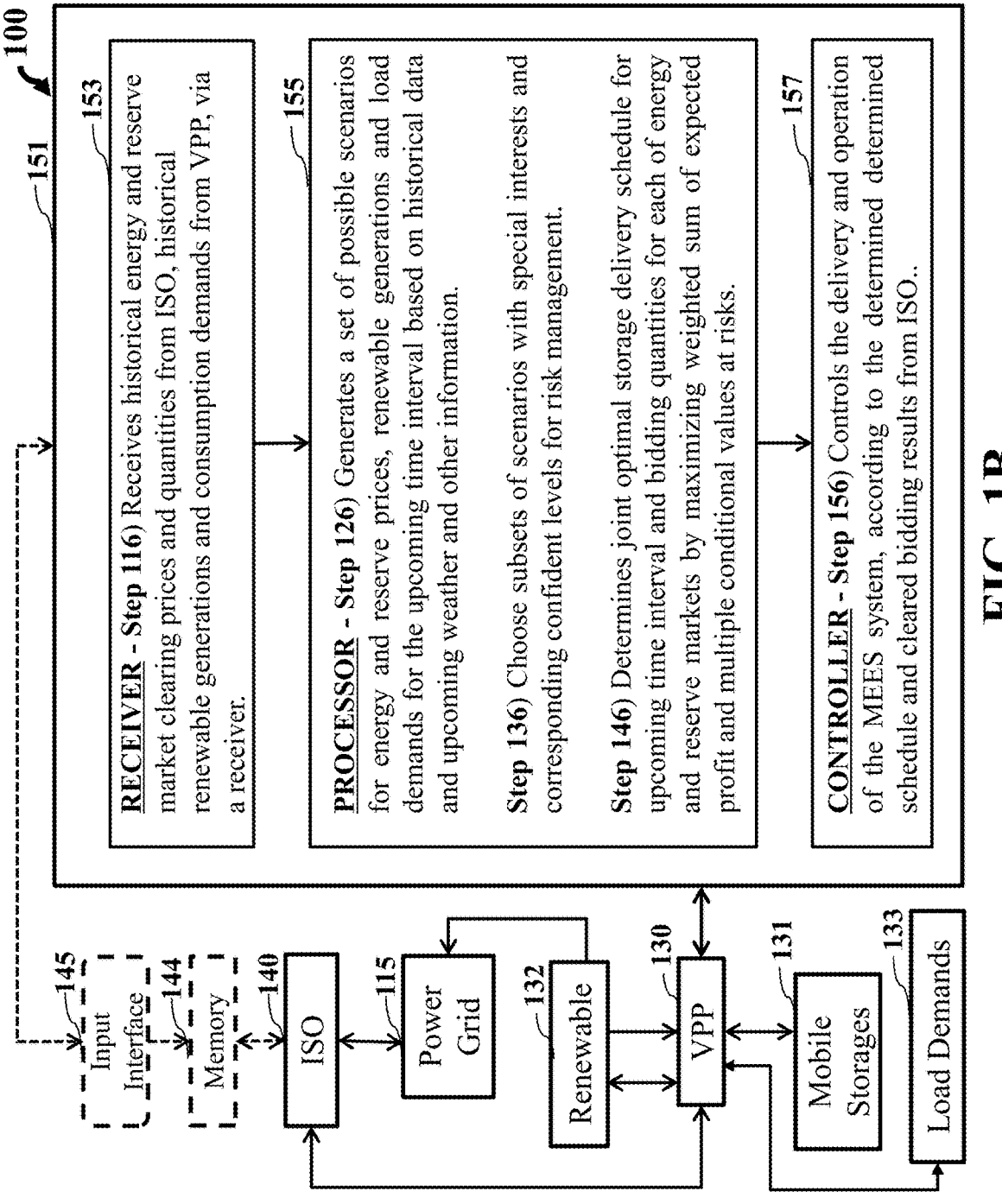

100

151

RECEIVER - Step 116) Receives historical energy and reserve market clearing prices and quantities from ISO, historical renewable generations and consumption demands from VPP, via a receiver. — 153

PROCESSOR - Step 126) Generates a set of possible scenarios for energy and reserve prices, renewable generations and load demands for the upcoming time interval based on historical data and upcoming weather and other information. — 155

Step 136) Choose subsets of scenarios with special interests and corresponding confident levels for risk management.

Step 146) Determines joint optimal storage delivery schedule for upcoming time interval and bidding quantities for each of energy and reserve markets by maximizing weighted sum of expected profit and multiple conditional values at risks.

CONTROLLER - Step 156) Controls the delivery and operation of the MEES system, according to the determined determined schedule and cleared bidding results from ISO.. — 157

145 — Input Interface

144 — Memory

140 — ISO

115 — Power Grid

132 — Renewable

130 — VPP

131 — Mobile Storages

133 — Load Demands

FIG. 1B

| List of parameters of the mobile energy storage | Value |
|---|---|
| Maximum energy capacity $E_k^{K,max}$ (MWh) | 8 |
| Maximum power capacity $P_k^{K,max}$ (MW) | 4 |
| Charging and discharging efficiency $\eta_k^{ES}$ | 0.9 |
| Energy storage operation cost (\$/MWh) | 4 |
| Fuel and labor cost for the carrier $C_k$ (\$/km) | 2 |
| Labor cost for installing the energy storage IC (\$) | 8 |

FIG. 4

| Case No. | $\beta_0$ | $\beta_1$ | $\beta_2$ | v (km/h) | Total expected profit($) | $CVaR_{0.8}$ ($) | $CVaR_{0.95}$ ($) |
|---|---|---|---|---|---|---|---|
| 1 | 0.9 | 0.05 | 0.05 | 0 | 12204 | 4870 | 3457 |
| 2 | 0.9 | 0.05 | 0.05 | 20 | 12214 | 5370 | 4351 |
| 3 | 0.95 | 0.025 | 0.025 | 20 | 12222 | 5300 | 4189 |

FIG. 9

| Case No. | $\beta_0$ | $\beta_1$ | $\beta_2$ | v (km/h) | Total expected profit ($) | $CVaR_{0.8}$ ($) | $CVaR_{0.95}$ ($) |
|---|---|---|---|---|---|---|---|
| 2 | 0.9 | 0.05 | 0.05 | 20 | 12214 | 5370 | 4351 |
| 4 | 0.9 | 0.1 | 0 | 20 | 12222 | 5300 | 4189 |
| 5 | 0.9 | 0 | 0.1 | 20 | 12209 | 5269 | 4416 |

FIG. 10

STOCHASTIC BIDDING STRATEGY FOR VIRTUAL POWER PLANTS WITH MOBILE ENERGY STORAGES

FIELD

The present disclosure relates generally to electric power systems, and more particularly bidding strategies for virtual power plants with mobile energy storages.

BACKGROUND

The deregulated electricity markets in North America are operated by Independent System Operators (ISOs) or Regional Transmission Organizations (RTOs) for providing reliable electricity to the consumers and maximizing the total social welfare of all the market participants. On one hand, the short-term energy markets consist of day-ahead (DA) and real-time (RT) markets, and they are the trading floors used by different participants for trading power strategically and maximizing economic benefits; on the other hand, the reserve markets, which mainly includes operating, non-operating and regulation reserve markets, are used to ensure the reliability of the power system operation, and all of these reserve markets have different clearing prices. In this circumstance, it is a complicated portfolio optimization problem for the market participants to maximize their total expected profits in multiple energy and reserve markets, where both the uncertain market prices and the properties of their physical assets should be considered. Moreover, in the last two decades, large scale intermittent renewable energy resources have been integrated in the power grid, and these renewable power producers not only need to face the volatile electricity and reserve prices, but also need to handle their uncertain renewable power productions.

To increase the economic benefits of multiple renewable energy sources (RESs), a framework of virtual power plant (VPP) has been proposed to aggregate the outputs of many renewable energy and demand sources and manage them as a single market participant in the electricity markets.

Energy storages were widely used by the virtual power plants to handle the uncertain renewable energy productions and market prices. On one hand, energy storages can help the real-time arbitrage the price differences in different time periods, because the renewable power can be stored by the storages during the time periods when the market prices are low, and then be sold by the virtual power plant during other time periods with higher prices; on the other hand, since the response time of the energy storages is usually fast, the virtual power plant can also participate in the multiple reserve markets to pursue higher profits.

For the virtual power plants' conventional bidding strategies, the energy storages are located at fixed locations. However, the virtual power plant may consist of multiple renewable energy resources (RESs) and demands at different buses, where the power productions, demands and market prices may be different, so the energy storages located at fixed buses may not sufficiently maximize of the virtual power plant's total expected profit in the energy and reserve markets. In recent years, large scale mobile energy storages were used for the operation of the distribution systems and microgrids with RESs. However, the large-scale mobile energy storages have not been utilized in the virtual power plant's optimal bidding strategies in the electricity market yet.

US 2014/0316973 A1 discloses an approach for facilitating the generation of energy-related revenue for an energy customer of an electricity supplier. The approach is used to generate operating schedules for a controller of the energy assets. When implemented, the generated operating schedules facilitates derivation of the energy-related revenue, over a time period T, associated with operation of the energy assets according to the generated operating schedule. The energy-related revenue available to the energy customer over the time period T is based at least in part on a wholesale electricity market.

However, all of these conventional approaches address solely the bidding problem by treating storages as a combination of generation and consumption device at a fixed location. Unfortunately, these conventional approaches do not notice that if the storages are transferrable, the storages can be more effectively used to relieve network congestion of power grid, enhance reserve response capability, and smooth load and renewable fluctuations. Using mobile energy storages, VPP can gain more economic benefits through more effectively utilizing storages at critical locations and at critical moments with better prices.

Accordingly, there is a need for more advanced energy and reserve bidding strategies for virtual power plants to fully utilize large scale mobile energy storages to optimize bidding in multiple electricity markets. In other words, there is a need for a joint optimization model for determining the optimal energy and reserve bidding strategies for the virtual power plant, and generating the optimal delivery schedules for its mobile energy storages simultaneously.

SUMMARY

The present disclosure relates to electric power systems, and more particularly to bidding strategies for virtual power plants with mobile energy storages.

The disclosure proposes a stochastic optimization-based energy and reserve bidding strategy for a virtual power plant (VPP), which has renewable energy resources, electric demands and mobile energy storages at multiple buses. In the proposed bidding strategy, the energy markets include the day-ahead (DA) and real-time (RT) energy markets, and the reserve markets include operating, regulation up and regulation down reserve markets. Since the energy and reserve prices, renewable power productions and electric demands at multiple buses may be different on the next day, each mobile energy storage can be delivered to a different bus for maximizing the virtual power plant's total expected profit in the market considering its risk preference.

In the proposed stochastic optimization model, the uncertain market prices, renewable power productions and electric demands are represented via scenarios, the conditional value at risk (CVaR) is used as the risk measure to manage the virtual power plant's risks in the worst-case scenarios, whose value depends on the confidence level specified by the virtual power plant. Additionally, since the virtual power plant may need to manage the risks related to multiple confidence levels, the proposed bidding strategy considered multiple Conditional values at risk with different confidence levels, which are optimized simultaneously in the objective function.

According to an embodiment of the present disclosure, a system for allocating electrical energy that includes distributing and receiving electrical energy using a mobile electrical energy storage (MEES) system at locations of a power supplier in a market-based resource allocation system by a market participant. Wherein a transceiver receives data including past data and other data, and a memory with executable programs and stored data. The system comprising a processor connected to the transceiver and the memory. The processor is configured to determine allocating amounts of the electrical energy for the MEES system and scheduling the amounts of the electrical energy of the MEES system for each time interval for all time intervals for an upcoming operating time period based on a set of uncertain parameters using an optimization model by calculate an objective function of the optimization model based on a subset of the uncertain parameters including energy and reserve market prices, renewable energy production and electric energy demands. Identify periodic and aggregate constraints, and update the objective function using a subset of the identified periodic and aggregate constraints. While optimizing the objective function for a value hierarchy associated with energy and reserve bidding scenarios for the market partici-pant and delivery scheduling for the MEES system based upon the stored market participant risk preferences. Control the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the deter-mined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals.

According to another embodiment of the present disclo-sure, a method for allocating electrical energy that includes distributing and receiving electrical energy using a mobile electrical energy storage (MEES) system at locations of a power supplier in a market-based resource allocation system by a market participant. Receiving data including past data and other data, and having executable programs and stored data in a memory. The method comprising using a processor connected to the transceiver and the memory. The processor is configured for determining allocating amounts of the electrical energy for the MEES system and scheduling the amounts of the electrical energy of the MEES system for each time interval for all time intervals for an upcoming operating time period based on a set of uncertain parameters using an optimization model by calculating an objective function of the optimization model based on a subset of the uncertain parameters including energy and reserve market prices, renewable energy production and electric energy demands. Identifying periodic and aggregate constraints, and updating the objective function using a subset of the identified periodic and aggregate constraints. While opti-mizing the objective function for a value hierarchy associ-ated with energy and reserve bidding scenarios for the market participant and delivery scheduling for the MEES system based upon the stored market participant risk pref-erences. Controlling the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the determined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals.

According to another embodiment of the present disclo-sure, a computer-implemented method for allocating elec-trical energy that includes distributing and receiving elec-trical energy using a mobile electrical energy storage (MEES) system at locations of a power supplier in a market-based resource allocation system by a market par-ticipant. Wherein each power supplier location includes one or a combination of an energy storage device, a renewable resource or an electrical load. Wherein executable programs and data are stored in a memory. The computer-implemented method comprising receiving data via a transceiver includ-ing past data and other data, the past data includes: (1) past energy and reserve market clearing price and quantity data from independent system operator (ISO), (2) past renewable generation and consumption demand data from a virtual power plant (VPP), and (3) past weather data; and the other data includes: (a) market participant data associated with confidence levels of the market participant related with conditional values at risk, (b) market participant electrical energy production data, and (c) energy related data. Using a processor connected to the transceiver and the memory. The processor is configured for determining allocating amounts of the electrical energy for the MEES system and scheduling the amounts of the electrical energy of the MEES system for each time interval for all time intervals for an upcoming operating time period based on a set of uncertain parameters using an optimization model by calculating an objective function of the optimization model based on a subset of the uncertain parameters including energy and reserve market prices, renewable energy production and electric energy demands. Identifying periodic and aggregate constraints, and updating the objective function using a subset of the identified periodic and aggregate constraints. While opti-mizing the objective function for a value hierarchy associ-ated with energy and reserve bidding scenarios for the market participant and delivery scheduling for the MEES system based upon the stored market participant risk pref-erences. Controlling the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the determined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals.

According to another embodiment of the present disclo-sure, a non-transitory computer readable storage medium embodied thereon a program executable by a computer for performing a method. The method for allocating electrical energy that includes distributing and receiving electrical energy using a mobile electrical energy storage (MEES) system at locations of a power supplier in a market-based resource allocation system by a market participant. Wherein ach power supplier location includes one or a combination of an energy storage device, a renewable resource or an electrical load. Such that executable programs and data are stored in a memory. The non-transitory computer readable storage medium comprising receiving data via a transceiver including past data and other data, the past data includes: (1) past energy and reserve market clearing price and quantity data from independent system operator (ISO), (2) past renewable generation and consumption demand data from a virtual power plant (VPP), and (3) past weather data; and the other data includes: (a) market participant data associated with confidence levels of the market participant related with conditional values at risk, (b) market participant electrical energy production data, and (c) energy related data. Using a processor connected to the transceiver and the memory. The processor is configured for determining allocating amounts of the electrical energy for the MEES system and scheduling the amounts of the electrical energy of the MEES system for each time interval for all time intervals for an upcoming operating time period based on a set of uncertain parameters using an optimization model by calculating an objective function of the optimization model based on a subset of the uncertain parameters including energy and reserve market prices, renewable energy production and electric energy demands. Identifying periodic and aggregate constraints, and updating the objective function using a subset of the identified periodic and aggregate constraints. While optimizing the objective function for a value hierarchy associated with energy and reserve bidding scenarios for the market participant and delivery scheduling for the MEES system based upon the stored market participant risk preferences. Controlling the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the determined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals.

According to another embodiment of the present disclosure, a system for allocating electrical energy that includes distributing and receiving electrical energy using a mobile electrical energy storage (MEES) system at locations of a power supplier in a market-based resource allocation system by a market participant. Each power supplier location includes one or a combination of an energy storage device, a renewable resource or an electrical load. Wherein the market participant includes power producing resources including renewable energy production facilities. The system comprising a transceiver receives data including past data and other data, the past data includes: (1) past energy and reserve market clearing price and quantity data from independent system operator (ISO), (2) past renewable generation and consumption demand data from a virtual power plant (VPP), and (3) past weather data, and the other data includes: (a) market participant data associated with confidence levels of the market participant used associated with conditional values at risk calculations, (b) market participant electrical energy production data, and (c) energy related data. A memory having executable programs and stored data. A processor connected to the transceiver and the memory. The processor is configured to determine allocating amounts of the electrical energy for the MEES system and scheduling the amounts of the electrical energy of the MEES system for each time interval for all time intervals for an upcoming operating time period based on a set of uncertain parameters using an optimization model by calculate an objective function of the optimization model based on a subset of the uncertain parameters including energy and reserve market prices, renewable energy production and electric energy demands. Identify periodic and aggregate constraints, and update the objective function using a subset of the identified periodic and aggregate constraints. While optimizing the objective function for a value hierarchy associated with energy and reserve bidding scenarios for the market participant and delivery scheduling for the MEES system based upon the stored market participant risk preferences. Control the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the determined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a block diagram illustrating a method for controlling an operation and bidding of a virtual power plant with mobile electrical energy storage (MEES) system, according to an embodiment of the present disclosure;

FIG. 1B is a schematic illustrating components and steps of controlling an operation and bidding of a virtual power plant with mobile electrical energy storage (MEES) system, according to some embodiments of the present disclosure;

FIG. 4 is a table illustrating the list of parameters of the mobile energy storage k, according to some embodiments of the present disclosure;

FIG. 9 is a table illustrating the total expected profit and conditional values at risk of the virtual power plant obtained in Cases 1-3, according to some embodiments of the present disclosure;

FIG. 10 is a table illustrating the total expected profit and conditional values at risk of the virtual power plant obtained in Cases 2, 4 and 5, according to some embodiments of the present disclosure;

Figure 1C:
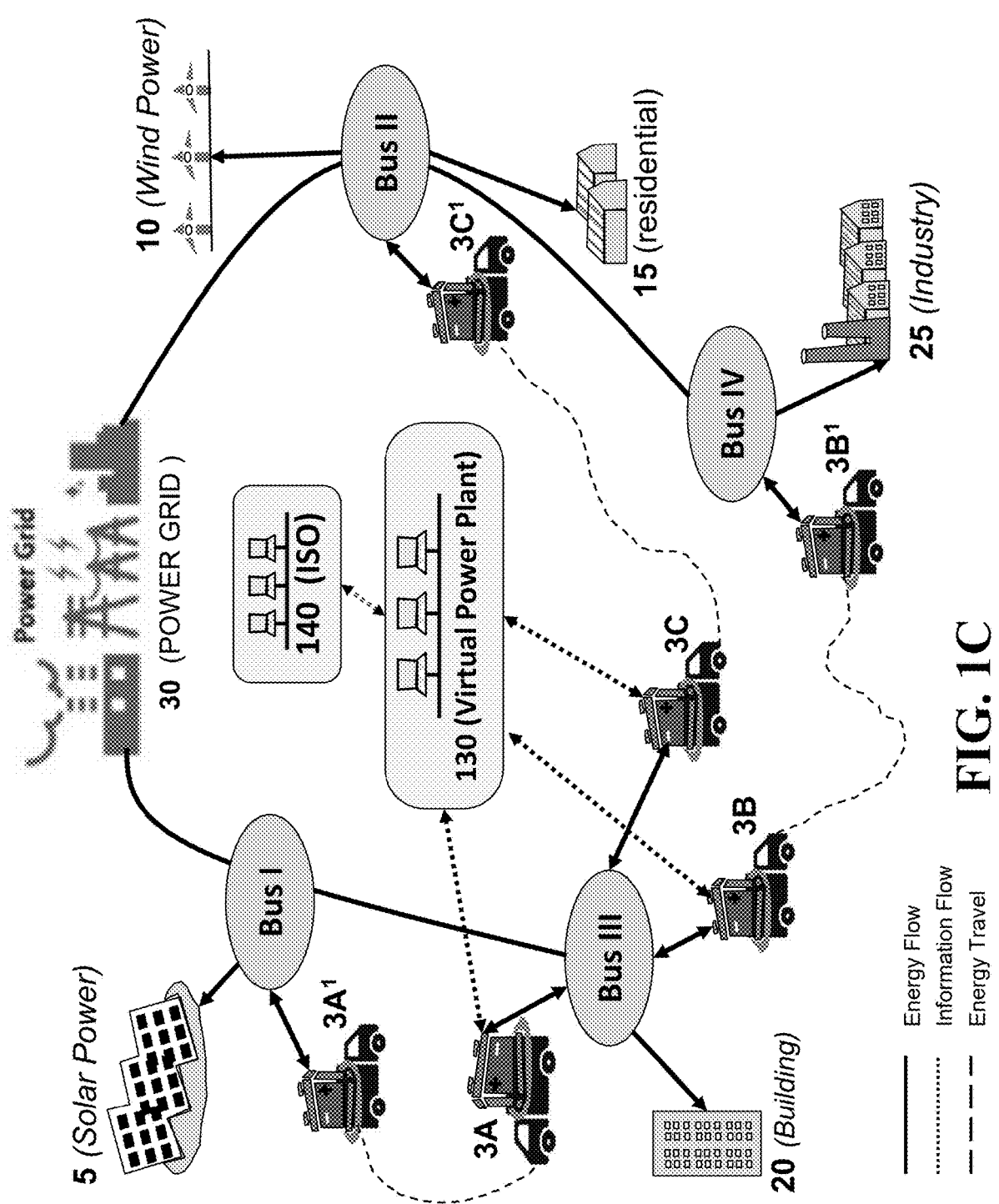
FIG. 1C is a schematic illustrating a virtual power plant connected with a power grid and communicated with ISO, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to electric power systems, and more particularly bidding strategies for virtual power plants with mobile energy storages.

This disclosure gives a stochastic optimization-based energy and reserve bidding strategy for a virtual power plant (VPP) with mobile energy storages, renewable energy resources (RESs) and load demands at multiple buses. In the proposed bidding strategy, the energy markets include the day-ahead and real-time energy markets, and the reserve markets include operating, regulation up and regulation down reserve markets. In view of the differences of energy and reserve prices, renewable generations and load demands between buses on the next day, the mobile energy storages can be delivered to different buses for maximizing the VPP's total expected profit considering its risk preference. In the stochastic optimization model for generating the bidding strategies, the uncertain market prices, renewable power productions and load demands are represented via scenarios, and the conditional value at risk (CVaR) is used as the risk measure to manage the VPP's risks in the worst case scenarios related to a confidence level. Since the VPP may need to manage the risks related to multiple confidence levels, the disclosed model maximizes multiple CVaRs with different confidence levels.

FIG. 1A is a block diagram illustrating a method for controlling an operation and bidding of a virtual power plant with mobile energy storages, according to embodiments of the present disclosure.

Step 116 of FIG. 1A, includes receiving, via a receiver 153, receives past energy and reserve market clearing prices and quantities from ISO, past renewable generations and consumption demands from VPP.

Step 126 of FIG. 1A, includes a processor 155 in communication with the receiver 153, is configured to generate a set of possible scenarios for energy and reserve prices, renewable generations and load demands for the upcoming time intervals based on past data and upcoming weather and other information.

Step 136 of FIG. 1A, is processed using the processor 155 to choose subsets of scenarios with special interests and corresponding confident levels for risk management.

Step 146 of FIG. 1A, is processed using the processor 155 to determine joint optimal storage delivery schedule for upcoming time intervals and bidding quantities for each of energy and reserve markets by maximizing weighted sum of expected profit and multiple conditional values at risk.

Step 156 of FIG. 1A, includes a controller 157 that can be used to control the delivery and operation of the mobile energy storages according to the determined delivery schedule and cleared bidding results from ISO.

The cleared bidding results refer to the accepting or rejecting decision made by ISO regarding the bids submit by the VPP. The VPP can execute its determined delivery and production schedule once its bids are accepted by the ISO.

FIG. 1B is a schematic illustrating components and steps of controlling an operation and bidding of a virtual power plant with mobile energy storages, according to embodiments of the present disclosure.

The VPP 130 comprises of mobile storages 131, renewable resources 132 and load demands 133. It communicates with ISO 140 which controls the operation of power grid 115. The control system 100 of a VPP 130 can include a computer 151 or like device, or multiple computers. It is contemplated the computer(s) can be located at different locations, and in communication with each other. Further, other components of the computer may be located at other locations, but are connected via a network, or some like arrangement.

Still referring to FIG. 1B, the receiver 153 of the VPP control system receives past energy and reserve market clearing prices and quantities from ISO, past renewable generations and consumption demands from VPP (step 116).

The processor 155 then, in communication with the receiver 153, generates a set of possible scenarios for energy and reserve prices, renewable generations and load demands for the upcoming time intervals based on past data and upcoming weather and other information (Step 126), and choose subsets of scenarios with special interests and corresponding confident levels for risk management (Step 136).

After the possible scenarios for market prices and VPP generation and demand are obtained, the processor 155 determines joint optimal storage delivery schedule for upcoming time intervals and bidding quantities for each of energy and reserve markets by maximizing weighted sum of expected profit and multiple conditional values at risk (step 146).

Still referring to FIG. 1B, the control system 100 of the VPP 130 sends the determined bids for the upcoming time intervals to the ISO 140, and the controller 157 controls the delivery and operation of the mobile storages according to the determined delivery schedule and cleared bidding results from ISO.

Optionally, the control system 100 of the VPP 130 can store the system energy and price data in a computer readable memory 144, wherein the computer readable memory is in communication with the processor 155 and controller 157. Further, it is possible an input interface 145 can be in communication with the memory 144 and the processor 155 and controller 157. For example, a user via a user interface of the input interface 145 may input predicted load demands and renewable generations. It is contemplated the receiver, processor and controller could be a single computer system or multiple computer systems located at different locations depending on the specific application(s).

FIG. 1C is a schematic illustrating a virtual power plant connected with a power grid and communicated with ISO, according to some embodiments of the present disclosure. In the figure, different line types are used to indicate the energy flow, information flow and energy travel between VPP and its components. The VPP 130 can be regarded as a group of aggregated renewable generations, load demands and storages that connected with power grid at one or points, i.e. buses. The renewables can include wind power 10, solar power 5 and other type of renewable resources. The load demands can include residential consumers 15, commercial consumers 20, and industry consumers 25. The storages 131 can be mobile that can be transferred between buses that the VPP connected with power grid 115. The VPP can inject powers into the power grid 115 such as renewable generations, and also extract powers from the grid 115 such as load demands. It can also provide bi-directional energy flows through charging and discharging of storages. Moreover, those storages can be transferable among available connected buses between the VPP and power grid. It provides more flexibility for the power grid to relieve network congestion, reduce system peaks, and improve power quality. The VPP communicates with ISO 140 to trade its generations and services, and based on ISO cleared results to dispatch its storages. In FIG. 1C, there are 3 mobile storages, 131 A, 131 B and 131 C. Those storages can be transferrer to different locations for each day once or multiple times based on operational needs determined by the VPP. For example, in FIG. 1C, three storages are initially located at Bus III, but are transferred to Bus I for storage 131 A (shown as 131 A$^1$), Bus IV for storage 131 B (shown as 131 B$^1$), and Bus II storage 131 C (shown as 131 C$^1$), respectively. The VPP 130 has bi-way communications with storages 131 to control its delivery and charging and discharging. The VPP 130 also has bi-way communications with ISO 140 to send bidding scenarios and received cleared bidding results.

Market Framework for the Virtual Power Plant

Products and Participants of the Energy and Reserve Markets

Figure 2A:
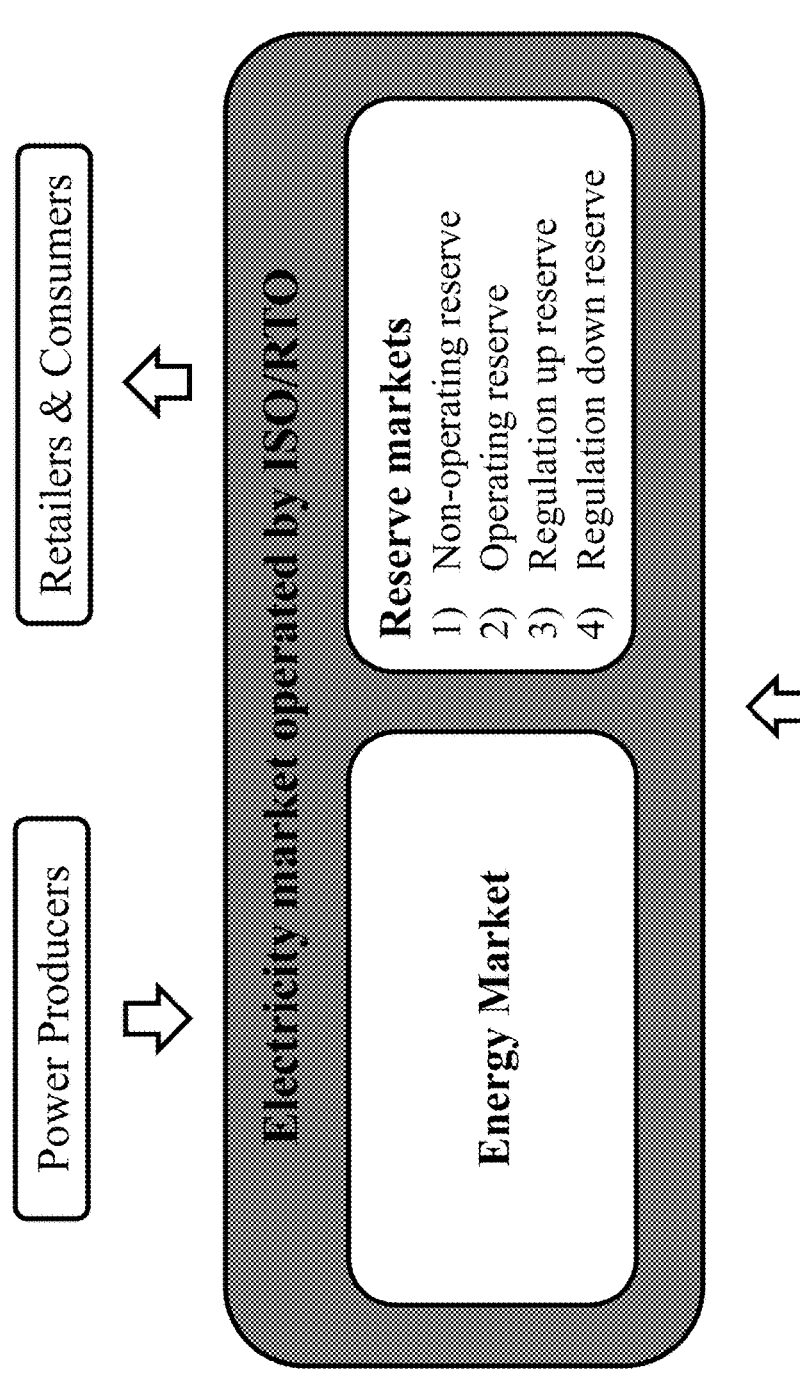
FIG. 2A is a block diagram illustrating tradable products and participants of the energy and reserve markets, according to some embodiments of the present disclosure.

FIG. 2A is a block diagram illustrating tradable products and participants of the energy and reserve markets, according to some embodiments of the present disclosure. For example, FIG. 2A shows that there are three types of reserve products, which includes the operating, non-operating and regulation reserves. Both the operating and regulation reserve resources should be online and able to increase or decrease power output within the required time frames, but the regulation reserves need to respond to generation or demand imbalances within a very short time period, which could be just several seconds. In contrast, the non-operating reserves could be offline and their response time is much longer than those of the operating and regulation reserve markets.

There are multiple types of participants in the energy and reserve markets. The power producers and consumers need to sell and buy power in the energy market, respectively. If the consumers do not have the knowledge of trading power or their demand levels do not meet the minimum bidding capacity requirements, the retailers can behave as the intermediaries between the consumers and the market. For the virtual power plant, since it has both power generation and demand resources, it may either buy or sell power in the energy market, which depends on its real-time power generation and demand levels. Additionally, market participants can provide ancillary services in the reserve markets, as long as their bidding capacities and response speed satisfy the reserve market requirements.

In this disclosure, the virtual power plant with mobile energy storages is assumed to participate in multiple energy and reserve markets. Non-operating reserve market is not considered for the virtual power plant in the proposed bidding strategy because its prices are usually lower than those of the operating and regulation reserve markets. Therefore, the energy, operating reserve and regulation reserve markets are assumed to be the virtual power plant's trading floors, and the virtual power plant is assumed to be a price-taker due to its small generation and demand capacities, which indicates the energy and reserve prices are not affected by the virtual power plant's bidding strategies.

Time Frame of the Energy and Reserve Markets

Figure 2B:
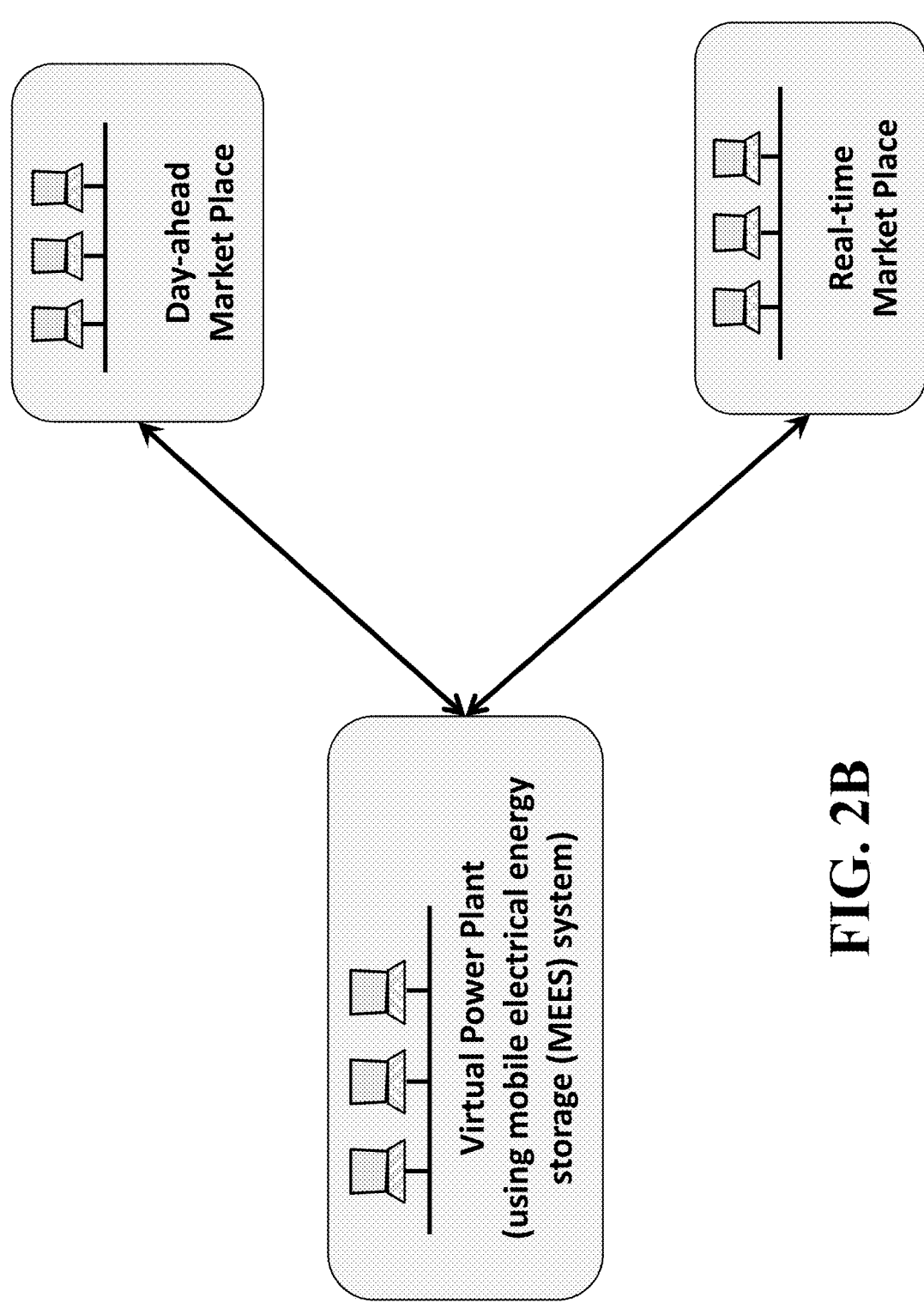
FIG. 2B is a schematic illustrating trading floors available for virtual power plants, according to some embodiments of the present disclosure.

FIG. 2B is a schematic illustrating trading floors available for virtual power plants. FIG. 2B shows that there are two trading floors available for the virtual power plant, which includes a day-ahead market place, and a real-time market place.

Figure 2C:
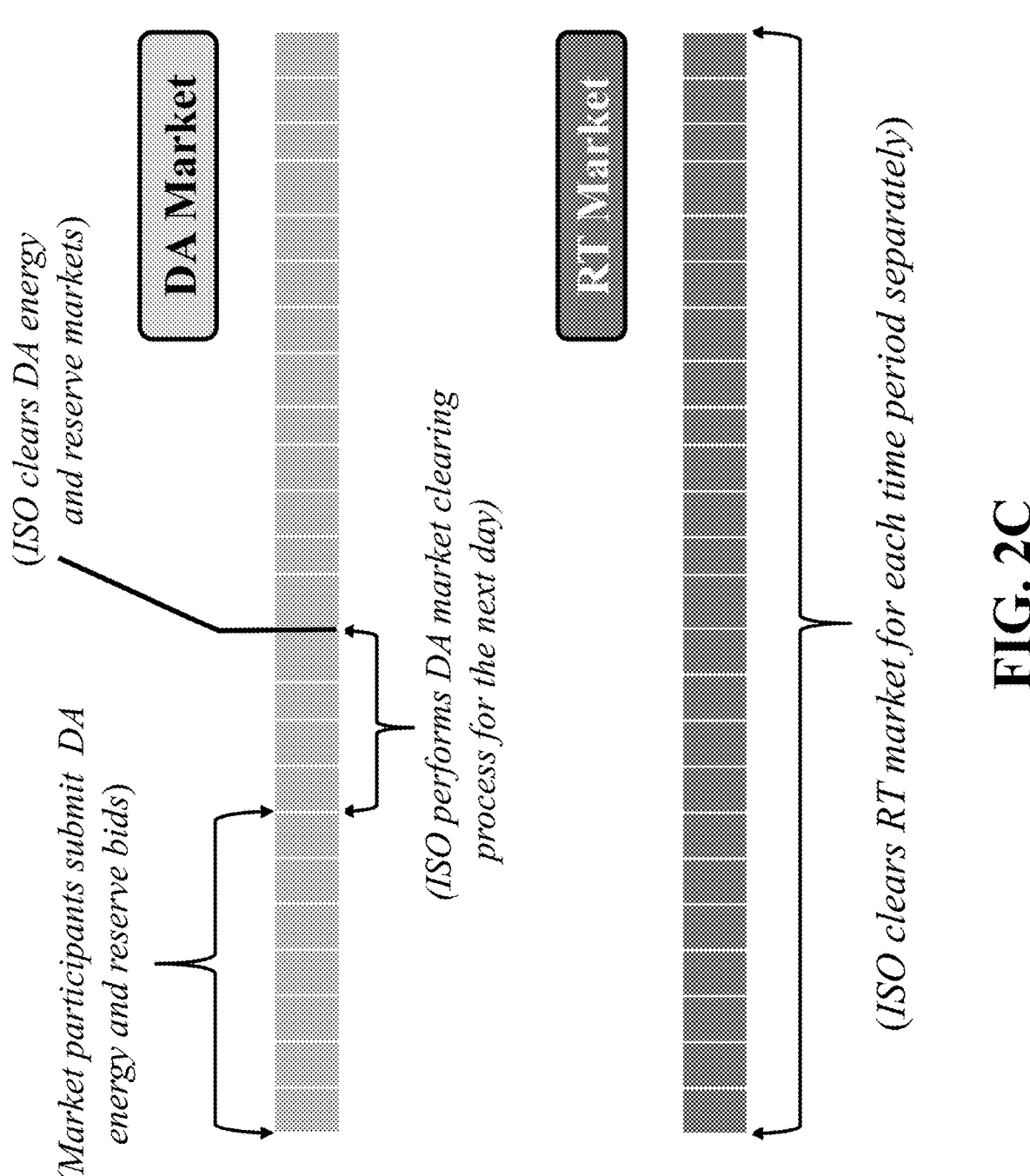
FIG. 2C is a schematic illustrating a time frame of the energy and reserve markets, according to some embodiments of the present disclosure.

FIG. 2C is a schematic illustrating a time frame of the energy and reserve markets, according to some embodiments of the present disclosure. For example, FIG. 2C shows the time frame of the energy and reserve markets. In the day-ahead market, the energy and reserve bids are submitted by the virtual power plant one day before the operating day, and those bids are cleared at the day-ahead energy and reserve prices. In the real-time market, the real-time power deviations, the deployed operating reserves and the deployed regulation reserves are all settled at real-time electricity prices on the operating day.

To maximize the total profits of the virtual power plant, the mobile energy storages can be delivered to other buses during the first several hours of the operating day. In this case, the operating and regulation reserve bids are limited by both the energy levels and delivery schedules of the virtual power plant's mobile energy storages.

Stochastic Optimization Model for Virtual Power Plant

Uncertainty Characterization and Multiple CVaR-Based Risk Management

There are multiple uncertainties faced by the virtual power plant when generating bidding strategies in the electricity markets, and stochastic optimization is used to maximize the expected profits of the virtual power plant, where the uncertain parameters are represented via scenarios.

In the disclosed model, there are seven types of uncertain parameters: day-ahead energy price, real-time energy price, operating reserve price, regulation up reserve price, regulation down reserve price, renewable energy production and electric demands.

All these uncertainties can be represented using a set of typical scenarios. The scenarios can be generated based on prediction of market prices, renewable generation and load demands using mathematical models, such as regression analysis, and machine learning. It can also be directly set as the past data of these parameters in the latest typical days.

Figure 2D:
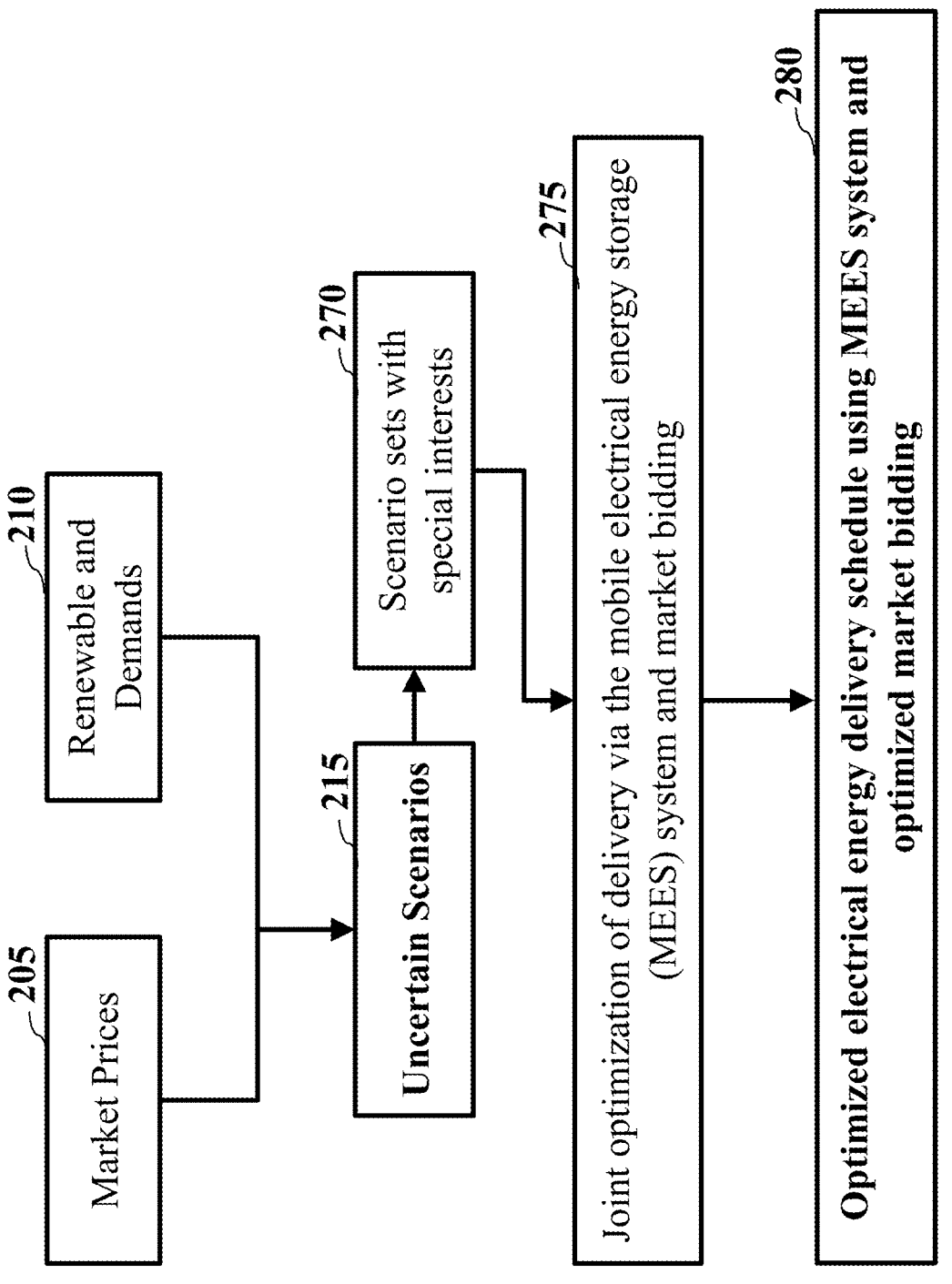
FIG. 2D is a block diagram for determining storage delivery and VPP bidding schedule, according to some embodiments of the present disclosure.

FIG. 2D is a block diagram for determining storage delivery and VPP bidding schedule, according to some embodiments of the present disclosure. A set of scenarios 215 of uncertain parameters are first determined based on past or predicted market prices 205, and renewable and demands 210. Then subsets of scenarios with special interests are identified and assigned with desired confidence levels for the risk management. After that, a joint optimization of storage delivery and VPP market bidding 275 can be executed, and the solutions will provide the required storage delivery and bidding schedules 280 for the VPP.

To manage the risks introduced by those uncertainties, the VPP may take either a risk-neutral strategy, a risk-averse strategy, or a risk-seeking strategy to determine its stochastic bidding strategy. The risk-neutral strategy is seeking the maximization of expected profit over all the scenarios. In contract, the risk-aversion strategy might be willing to scarify the expected profits but avoid potential loss or low profits in some low profitable scenarios, and the risk-seeking strategy might be willing to scarify the expected profits but avoid losing potential high profits for some high profitable scenarios. This disclosure only focuses on the risk-aversion strategy, but can be easily extended to the risk-seeking strategy.

Figure 2E:
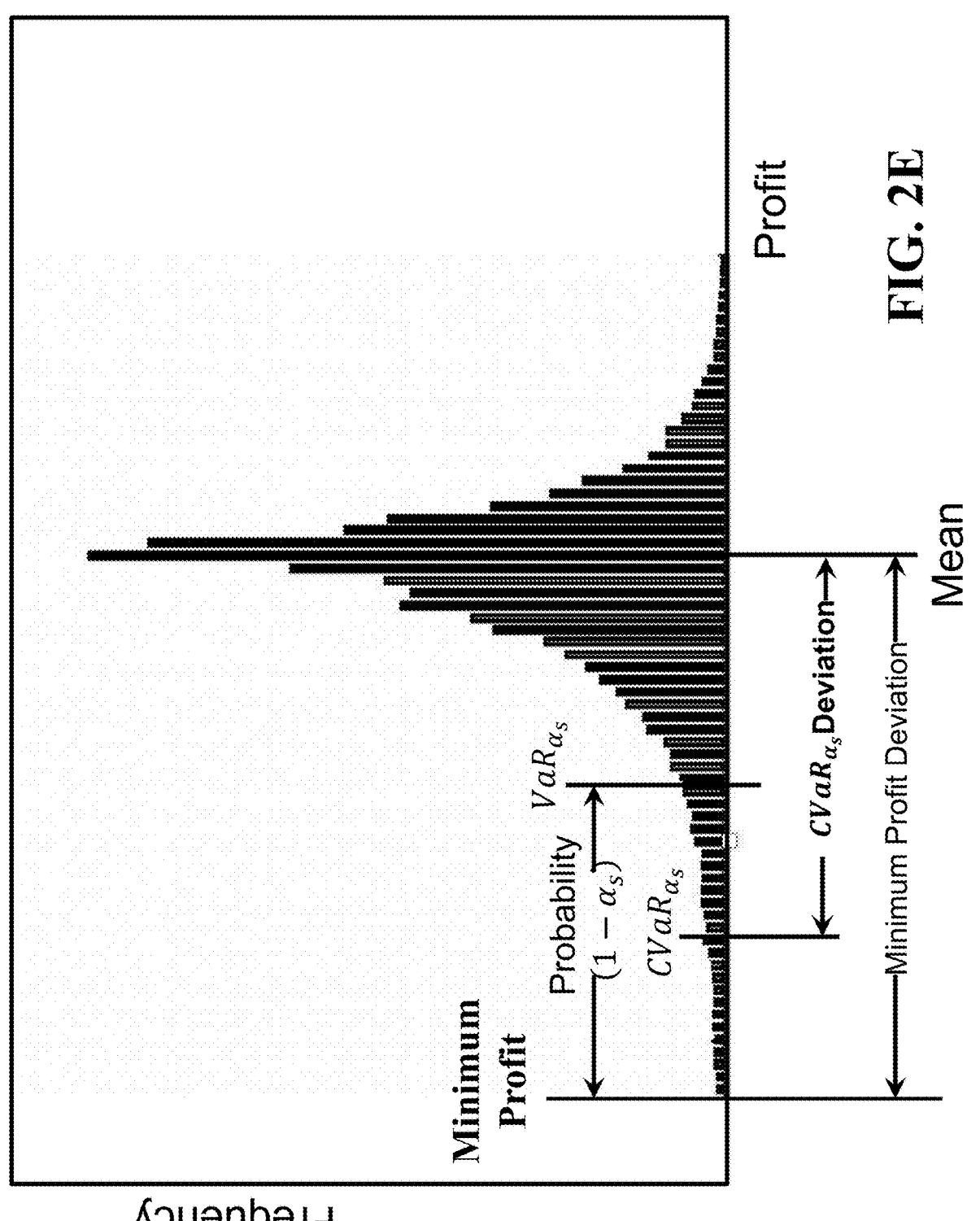
FIG. 2E is a schematic illustrating the conditional values at risk of virtual power plant bidding, according to some embodiments of the present disclosure.

To quantity the bidding risks faced by a VPP, the CVaR can be used to measure the risks in the worst-case scenarios. FIG. 2E is a schematic illustrating the conditional values at risk of virtual power plant bidding.

As shown in FIG. 2E, each CVaR corresponds to a confidence level $\alpha_s$ ($0<\alpha_s<1$) that specified by the decision maker. The CVaR with confidence level $\alpha_s$ can be denoted as $CVaR_{\alpha_s}$, whose value is equal to the expected profit of the $(1-\alpha_s)\times100\%$ least profitable scenarios. Considered that the decision maker might need examining risks at different confident levels, multiple CVaRs are used in this disclosure corresponding to different confidence levels. The risk-aversion VPP can determine its bidding strategy by maximizing a weighted sum of expected profit over all uncertain scenarios and multiple CVaRs corresponding to different sets of least profitable scenarios. The weight assigned to each $CVaR_{\alpha_s}$ measures the risk aversion degree of the VPP. A larger risk aversion degree for $CVaR_{\alpha_s}$ indicates the VPP is more risk averse, who is willing to decrease the total expected profit of all the scenarios to improve the expected profit of the $(1-\alpha_s)\times100\%$ worst scenarios.

In this circumstance, the objective function of a risk-averse participant's stochastic optimization model is the sum of the weighted expected profit and conditional value at risk, where the sum of the weights is equal to 1. The weight assigned to the conditional value at risk is denoted is referred to the risk aversion degree of the participant as well.

In the conventional risk-averse bidding strategies in the electricity market, only one conditional value at risk is used by the market participant, which means only the risk related to one confidence level is considered. However, in practice, the risks related to multiple confidence levels may need to be considered in the virtual power plant's optimal bidding strategy with uncertainties. On the one hand, a virtual power plant owner may be interested in controlling the risks related to multiple confidence levels. On the other hand, a virtual power plant may be owned or managed by multiple decision makers, and they may care about the risks related to different confidence levels.

Therefore, assumed there are S different conditional values at risk with different confidence levels are included in the disclosed stochastic optimization model, and Bs is the weight assigned to the s-th conditional value at risk with confidence level as. The weights in the objective function should satisfy $$\sum_{s=0}^{S} \beta_s = 1,$$

where $\beta_0$ is the weight assigned to the expected profit. Therefore, the total expected profit and S different conditional values at risk can be maximized simultaneously by solving the proposed stochastic optimization model.

Mathematical Formulations of the Disclosed Model

The purpose of generating bidding strategy for a virtual power plant is to determine the storage allocation schedule and renewable generation and demand consumption schedule for an upcoming operating time period, and the operating time period include a set of time intervals with equal length. The typical length of operating time period can be one day, portion of a day, or multiple days. The typical length of time interval can be 60 minutes, 30 minutes, 15 minutes, or 5 minutes.

The generation of the bidding strategies for the virtual power plant is formulated as a stochastic optimization model.

The objective function as shown in (1) is to maximize the weighted sum of the total expected profit and the CVaRs with different confidence levels, $\pi_{total}$, over the set of decision variables, $$\Xi: \max_{\Xi} \pi_{total} = \beta_0 \sum_{w=1}^{W} pr_w \left( \pi_w^{EM} + \pi_w^{OR} + \pi_w^{reg} - C_w^{MES} - C_{deli} - C_{inst} \right) + \sum_{s=1}^{S} \beta_s CVaR_{\alpha_s}$$ (1)

Wherein, w is an index of uncertain scenarios, running from 1 to W; and s is an index of CVaRs, running from 1 to S. $pr_w$ represents the probability of a scenario w, i.e. the occurring frequency of scenario w.

$$\pi_w^{EM}$$

represents the total profit in day-ahead and real-time energy market for scenario w($).

$$\pi_w^{OR}$$

represents the total profit in the operating reserve market for scenario w($).

$$\pi_w^{reg}$$

represents the total profit in the regulation reserve market for scenario w($).

$$C_w^{MES}$$

represents the total energy storage operation cost of scenario w($). $C_{deli}$ represents the total labor and fuel cost of delivering the energy storages ($). $C_{inst}$ represents the total labor cost of installing the energy storages ($). $\beta_0$ is a weight parameter assigned to the total expected profit of the virtual power plant. $\alpha_s$ is a confidence level parameter for the s-th CVaR. $\beta_s$ is a risk aversion degree parameter for the s-th CVaR with confidence level $\alpha_s$.

The expected profit in each scenario w is equal to the total expected revenue minus the total expected cost. The total expected profit in scenario w is the sum of the revenue in the energy market $$\pi_w^{EM},$$

the revenues in operating reserve market $$\pi_w^{OR},$$

and the revenue in regulation reserve market $$\pi_w^{reg},$$

which are calculated using constraints (2)-(4), respectively:

$$\pi_w^{EM} = \sum_{t=1}^{T} \sum_{n=1}^{N} \left( \lambda_{ntw}^{DA} P_{nt}^{DA} + \lambda_{ntw}^{RT} P_{ntw}^{RT+} - \lambda_{ntw}^{RT} P_{ntw}^{RT-} \right) \forall \ W \quad (2)$$

$$\pi_w^{OR} = \sum_{t=1}^{T} \sum_{n=1}^{N} \left( \lambda_{ntw}^{OR} P_{nt}^{OR} + \lambda_{ntw}^{RT} P_{nt}^{OR} \eta_{nt}^{OR} \right) \forall \ w \quad (3)$$

$$\pi_w^{reg} = \sum_{t=1}^{T} \sum_{n=1}^{N} \quad (4)$$
$$\left[ \lambda_{ntw}^{reg,up} P_{nt}^{reg,up} + \lambda_{ntw}^{reg,down} P_{nt}^{reg,down} + \right.$$
$$\left. \lambda_{ntw}^{RT} \left( \eta_{nt}^{reg,up} P_{nt}^{reg,up} + \eta_{nt}^{reg,down} P_{nt}^{reg,down} \right) \right] \forall \ w$$

wherein, t is an index of time periods, running from 1 to T; n is an index of buses, running from 1 to N.

$$\lambda_{ntw}^{DA}$$

a parameter representing the day-ahead electricity price at bus n in time t in scenario w ($/MWh).

$$\lambda_{ntw}^{RT}$$

is a parameter representing the real-time electricity price at bus n in time t in scenario w ($/MWh).

$$\lambda_{ntw}^{OR}$$

is a parameter representing the operating reserve price at bus n in time t in scenario w ($/MWh).

$$\lambda_{ntw}^{reg,up}$$

is a parameter representing the regulation up price at bus n in time t in scenario w ($/MWh).

$$\lambda_{ntw}^{reg,down}$$

is a parameter representing the regulation down price at bus n in time t in scenario w ($/MWh).

$$P_{nt}^{DA}$$

is a variable representing the power bid in day-ahead energy market at bus n in time t (MW).

$$P_{ntw}^{RT+}$$

is a variable representing the positive real-time deviation at bus n in time t in scenario w (MW).

$$P_{ntw}^{RT-}$$

is a variable representing the positive/negative real-time deviation at bus n in time t in scenario w (MW).

$$P_{nt}^{OR}$$

is a variable representing the operating reserve bid at bus n in time t (MW).

$$P_{nt}^{reg,up}$$

is a variable representing the regulation up reserve bid at bus n in time t (MW).

$$P_{nt}^{reg,down}$$

is a variable representing the regulation down reserve bid at bus n in time t (MW).

$$\eta_{nt}^{OR}$$

is a parameter representing the percentage of the deployed operating reserves at bus n in time t.

$$\eta_{nt}^{reg,up}$$

is a parameter representing the percentage of the deployed regulation up reserves at bus n in time t.

$$\eta_{tn}^{reg,down}$$

is a parameter representing the percentage of the deployed regulation down reserves at bus n in time t.

The total expected cost is the sum of the energy storage operation cost $$C_w^{MES},$$

energy storage delivery cost $C_{deli}$ and energy storage installation cost $C_{inst}$, which are calculated using constraints (5)-(7), respectively:

$$C_w^{MES} = \sum_{n=1}^{n=N} \sum_{t=1}^{T} \sum_{k=1}^{K} C_k \left( P_{kntw}^{dis,RT} + P_{kntw}^{ch,RT} \right) \forall\, w \tag{5}$$

$$C_{deli} = DC \sum_{k=1}^{k=K} \sum_{n=1}^{n=N} \sum_{m=1}^{m=N} z_{km}^0 z_{kn} d_{mn} \forall\, w \tag{6}$$

$$C_{inst} = IC \sum_{k=1}^{k=K} \sum_{n=1}^{n=N} \sum_{m=1}^{m=N} z_{km}^0 z_{kn} v_{mn} \forall\, w \tag{7}$$

Wherein, k is an index of mobile energy storages, running from 1 to K; m is an index of buses, running from 1 to N. $C_k$ is a parameter representing operation cost per MW for energy storage k ($/MW). DC is a parameter representing fuel and labor cost per km for delivering the mobile energy storage ($/km). IC is a parameter representing labor cost for installing an energy storage after being delivered to another bus on the next day ($).

$$P_{kntw}^{ch,RT}$$

is a variable representing the real-time charge power of energy storage k at bus n in time t in scenario w (MW).

$$P_{kntw}^{dis,RT}$$

is a variable representing the real-time discharge power of energy storage k at bus n in time t in scenario w (MW). $z_{kn}$ is a binary variable, which is equal to 1 if the energy storage k is delivered to bus n and 0 otherwise.

$$z_{km}^0$$

is a binary parameter, which is equal to 1 if the energy storage k is located at bus m at the beginning and 0 otherwise. $d_{mn}$ is a parameter representing the delivery distance between bus m and n, which is 0 if m=n (km). $v_{mn}$ is a binary parameter, which is equal to 0 if m=n and 1 otherwise.

In constraint (6), the energy storage delivery cost is proportional to the delivery distance $d_{mn}$ if it is delivered from bus m to bus n. In constraint (7), the parameter $v_{mn}$ is calculated using (8), and it indicates that if the energy storage is not delivered to a different bus on the next day, its labor cost for installation is $$zerv_{mn} \begin{cases} 0, & m = n \\ 1, & m \neq n \end{cases} \forall\, m, n \tag{8}$$

The conditional values at risk in (1) are calculated based on (9):

$$CVaR_{\alpha_s} = \zeta_s - \frac{1}{1 - \alpha_s} \sum_{w=1}^{W} pr_w \eta_w^s \forall\, w, s \tag{9}$$

wherein $\zeta_s$ and $$\eta_w^s$$

are the ancillary variables used for calculating $CVaR_{\alpha_s}$, which are subject to the constraints of (10) and (11):

$$\eta_w^s \geq 0 \ \forall\, w, s \tag{10}$$

$$\zeta_s - \eta_w^s \leq \pi_w^{EM} + \pi_w^{OR} + \pi_w^{reg} - C_w^{MES} - C_{deli} - C_{inst} \forall\, w, s \tag{11}$$

The stochastic optimization model is further subject to a set of constraints (12)~(30). Constraint (12) ensures the real-time power balance of the virtual power plant at each bus, where the total power sold to the energy and reserve markets should be equal to the real-time renewable power productions and the discharged power of the energy storages minus the electric demand consumption and the charged power of the energy storages.

$$P_{nt}^{DA} + \eta_{nt}^{OR} P_{ntw}^{OR} + \eta_{nt}^{reg,up} P_{nt}^{reg,up} - \eta_{nt}^{reg,down} P_{n,i}^{reg,down} + P_{ntw}^{RT+} - P_{ntw}^{RT-} =$$

$$\sum_{i \in \Psi_n^I} P_{itw}^{RES} + \sum_{k=1}^{K} \eta_k^{ES} P_{kntw}^{dis,RT} - \sum_{j \in \Psi_n^J} P_{jtw}^{DEM} - \sum_{k=1}^{K} P_{kntw}^{ch,RT} / \eta_k^{ES}$$

wherein i is an index of renewable energy resources, running from 1 to I; j is an index of electric demands, running from 1 to J;

$$\Psi_n^I$$

is a set of ule renewable energy resources located at bus n.

$$\Psi_n^J$$

is a set of the demands located at bus n.

$$\eta_k^{ES}$$

is a parameter representing the charging and discharging efficiency of energy storage k.

$$P_{itw}^{RES}$$

scenario w (MW).

$$P_{jtw}^{DEM}$$

is a parameter representing electric demand for unit j in time t in scenario w (MW).

Constraint (13)-(18) ensure the lower and upper bounds of the bidding capacities in the day-ahead energy market, real-time energy market, operating reserve market, regulation up reserve market and regulation down reserve market:

$$P^{DA,min} \leq P_{tn}^{DA} \leq P^{DA,max} \forall n, T \tag{13}$$

$$0 \leq P_{nt}^{OR}, P_{nt}^{reg,up}, P_{nt}^{reg,down}, P_{ntw}^{RT+}, P_{ntw}^{RT-} \forall n, t, w \tag{14}$$

$$P_{ntw}^{RT+} \leq M\left(1 - y_{ntw}^{RT}\right) \forall n, t, w \tag{15}$$

$$P_{ntw}^{RT-} \leq My_{ntw}^{RT} \forall n, t, w \tag{16}$$

$$P_{nt}^{OR} + P_{nt}^{reg,up} \leq \sum_{k=1}^{K} \eta_k^{ES} P_{kntw}^{dis,RT} \forall n, t, w \tag{17}$$

$$P_{nt}^{reg,down} \leq \sum_{k=1}^{K} P_{kntw}^{ch,RT} / \eta_k^{ES} \forall n, t, w \tag{18}$$

wherein $P^{DA,min}$ and $P^{DA,max}$ are parameters representing lower bound and upper bound of the bidding capacity in the day-ahead energy market for the virtual power plant.

$$y_{ntw}^{RT}$$

is a binary variable, which is equal to 1 if the real-time power deviation of the virtual power plant is positive at bus n in and 0 otherwise in time t in scenario w. M is a large enough constant.

In constraint (13), the lower and upper bounds of the day-ahead bidding capacities are limited by the virtual power plant's credits and the total generation and demand capacities. Constraint (14) ensures the non-negativity of the bidding capacities in the real-time energy market, operating reserve market, regulation up reserve market and regulation down reserve market. Constraints (15) and (16) ensure either the positive or the negative real-time power deviation of the virtual power plant is zero. Constraint (17) and (18) limit the reserve bidding capacities based on the charging and discharging power capacities of the energy storages, because it is assumed only the energy storages satisfy the requirements of providing the reserve services.

Constraint (19) ensures that each energy storage can be located at only one of the virtual power plant's buses:

$$\sum_{n=1}^{n=N} z_{kn} \forall k \tag{19}$$

Constraints (20)-(22) limit the energy level of the energy storages in each time period t considering their initial locations:

$$E_{kntw} = z_{kn}E_k^{K,0} - P_{kntw}^{dis,RT}\Delta t + P_{kntw}^{ch,RT}\Delta t = 1, n, w, k \forall t \tag{20}$$

$$E_{kn(t+1)w} = E_{kntw} - P_{kntw}^{dis,RT}\Delta t + P_{kntw}^{ch,RT}\Delta t > 1, n, w, k \forall t \tag{21}$$

$$0 \leq E_{kntw} \leq E_k^{K,max} z_{kn} \forall n, t, w, k \tag{22}$$

Wherein $\Delta t$ is the duration of time period. $E_{kntw}$ is a variable representing the real-time energy level of the storages k at bus n in time t in scenario w (MWh).

$$E_k^{K,max}$$

is a parameter representing the maximum energy/power capacity for energy storage k (MWh).

$$E_k^{K,0}$$

is a parameter representing the initial energy level for energy storage k (MWh).

Constraints (23)-(28) limit the power charging and discharging capacities considering the energy storage delivery status in the first several hours on the next day:

$$0 \leq P_{kntw}^{dis,RT}, P_{kntw}^{ch,RT} \forall n, t, w, k \tag{23}$$

$$P_{kntw}^{dis,RT} + P_{kntw}^{ch,RT} \leq P_k^{K,max} z_{k,n} \forall n, t, w, k \tag{24}$$

$$\sum_{k=1}^{K} P_{kntw}^{dis,RT} \leq M\left(1 - x_{tnw}^{ES}\right) \forall n, t, w \tag{25}$$

$$\sum_{k=1}^{K} P_{kntw}^{ch,RT} \leq Mx_{ntw}^{ES} \forall n, t, w \tag{26}$$

$$P_{kntw}^{ch,RT} \leq M\sum_{m=1}^{m=N} z_{km}^0 f_{mnt} \forall n, t, w, k \tag{27}$$

$$P_{kntw}^{dis,RT} \leq \sum_{m=1}^{m=N} z_{km}^0 f_{mnt} \forall n, t, w, k \tag{28}$$

wherein $$x_{ntw}^{ES}$$

is a binary variable, which is equal to 1 if the energy storages at bus n are charging and 0 if discharging in time t in scenario w.

$$P_k^{K,max}$$

is a parameter representing the maximum power capacity for energy storage k (MWh). $f_{mnt}$ is a binary parameter, which is equal to 0 if the energy storage is on the way of being delivered from bus m to bus n and 1 otherwise.

It is noted that for simplification purpose, we assume the storage can only relocate once per day for formulating the above constraints. However, it can easily be extended to relocating multiple times per day.

The constraints (27) and (28) indicate that the energy storage cannot charge or discharge power during the delivery process, where the parameter $f_{mnt}$ is calculated using (29):

$$f_{mnt} = \begin{cases} 0, & t \le d_{mn}/v \\ 1, & t > d_{mn}/v \end{cases} \quad \forall \, m, n, t \qquad (29)$$

where $f_{mnt}$ is equal to 0 if the time period t is less than the time of delivering the an energy storage from bus m to n, and the energy storage cannot be charged or discharged in time period t. v is a parameter representing drive speed of the carrier of the energy storages (km/h).

Constraint (30) addresses the binary variables used in the proposed optimization model.

$$x^{ES}_{ntw}, y^{RT}_{ntw}, z_{kn} \in \{0, 1\} \; \forall \, n, t, w, k \qquad (30)$$

It should be noted that the energy level $E_{ktw}$, charging power $$P^{ch,RT}_{ktw}$$

and discharging power $$P^{dis,RT}_{ktw}$$

for each energy storage k in time t are not given directly the in the proposed model, but they can be calculated using (31)-(33).

$$E_{ktw} = \sum_{n=1}^{n=N} z_{kn} E_{kntw} \; \forall \, t, w, k \qquad (31)$$

$$P^{dis,RT}_{ktw} \sum_{n=1}^{n=N} z_{kn} P^{dis,RT}_{kntw} \; \forall \, t, w, k \qquad (32)$$

$$\sum_{n=1}^{n=N} z_{kn} P^{ch,RT}_{kntw} \; \forall \, t, w, k \qquad (33)$$

wherein $E_{ktw}$ is a variable representing the real-time energy level of the storages k in time t in scenario w (MWh).

$$P^{ch,RT}_{ktw}$$

is a variable representing the real-time charging power of energy storage k in time t in scenario w (Mw).

$$P^{dis,RT}_{ktw}$$

is a variable representing the real-time discharging power of energy storage k in time t in scenario w (MW). The equations (31)-(33) are nonlinear and not needed for generating the optimal bidding strategies, but they can be used to calculate the values of $$E_{ktw}, P^{dis,RT}_{ktw}, \text{ and } P^{ch,RT}_{ktw}$$

after the optimization model is solved and the optimal solutions for $$z_{kn}, E_{kntw} \text{ and } P^{ch,RT}_{kntw}$$

are determined.

After solving the optimization model (1)-(30), the optimal energy and reserve bidding strategies for the virtual power plant and the delivery schedules for the mobile energy storages can be generated simultaneously considering the virtual power plant's risk preference.

Simulation Results

Figure 3:
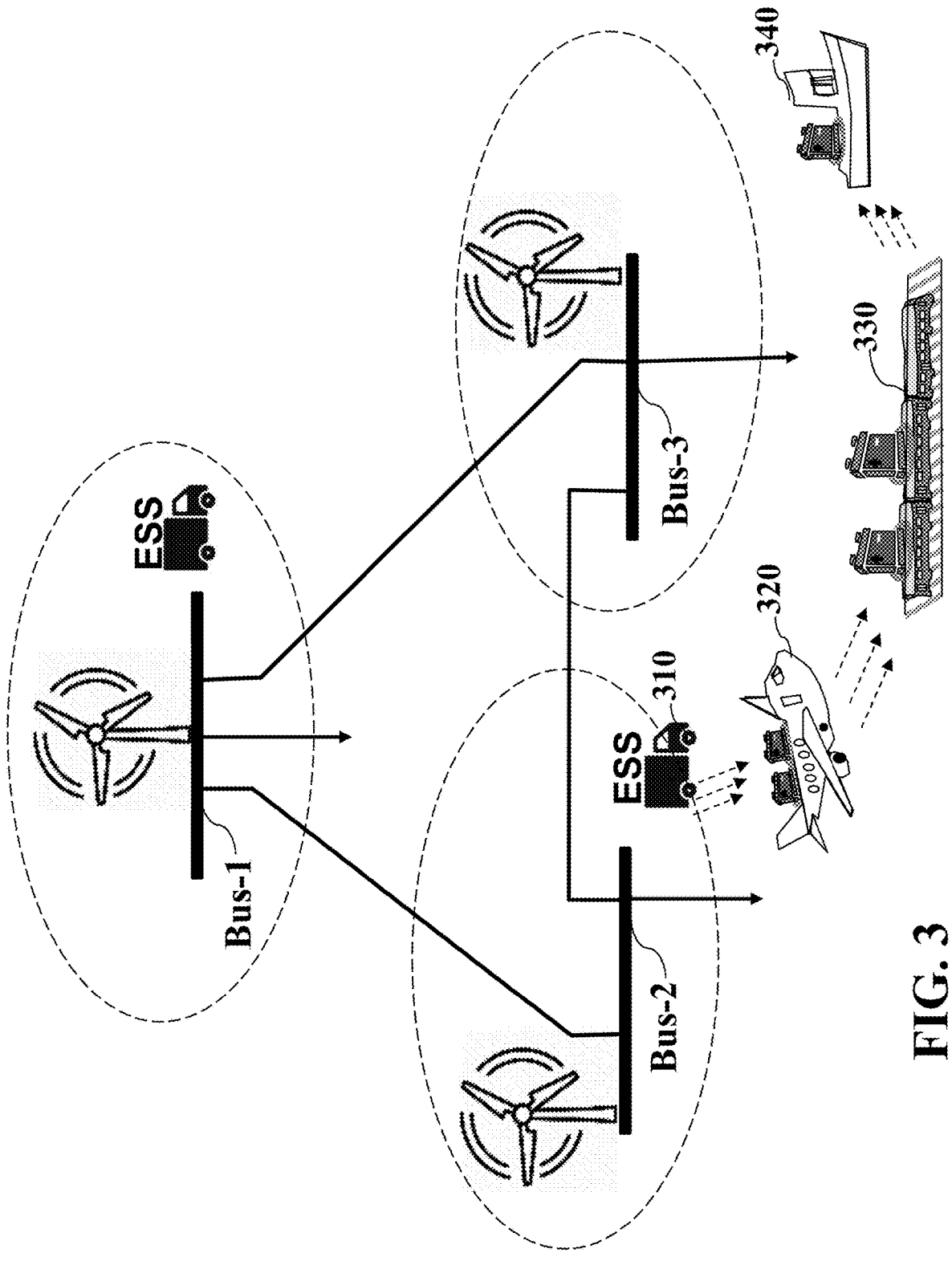
FIG. 3 is a schematic illustrating a virtual power plant with resources at 3 buses, according to some embodiments of the present disclosure.

FIG. 3 is a schematic illustrating a virtual power plant with resources at 3 buses, according to some embodiments of the present disclosure. Case studies are carried out for the virtual power plant as shown in FIG. 3 to demonstrate the effectiveness of the disclosed energy and reserve bidding strategy. The VPP include two mobile energy storages, and three electric demands and renewable energy sources located at three buses. The distances between any two buses are 30 km.

Contemplated is that MEES system can include one or a combination of vehicles 310, planes 320, trains 330 or boats 340, to transport one or more storage devices configured to transport stored electrical energy to the locations of the power supplier, and receive electrical energy from one or a combination of the energy storage device(s) of the power supplier, a renewable resource of the power supplier, or a power grid, by charging the one more storages devices of the MEES system where the MEES system is configured to transport the received electrical energy to another location.

FIG. 4 is a table illustrating the list of parameters of the mobile energy storage k, according to some embodiments of the present disclosure. For example, FIG. 4 show this virtual power plant has two mobile energy storages with the same parameters, and speed of the energy storage carrier is initially set to be 20 km/h. The historical energy and reserve prices, the historical wind power data and the historical demand data of practical systems are used. The percentages of the reserves deployed in the real-time market are all set to be 0.9.

The disclosed conditional values at risk constrained bidding strategy is studied, where the energy storages are located at Bus 3 at the beginning, and two conditional values at risk with confidence levels 0.8 and 0.95 are considered by the virtual power plant. First, the weights assigned to the total expected profit, $CVaR_{0.8}$ and $CVaR_{0.9}$ are 0.9, 0.05 and 0.05, respectively. In the studied cases, 40 scenarios of the uncertain parameters are generated by using the latest historical data of 40 days directly.

Figures 5A, 5B:
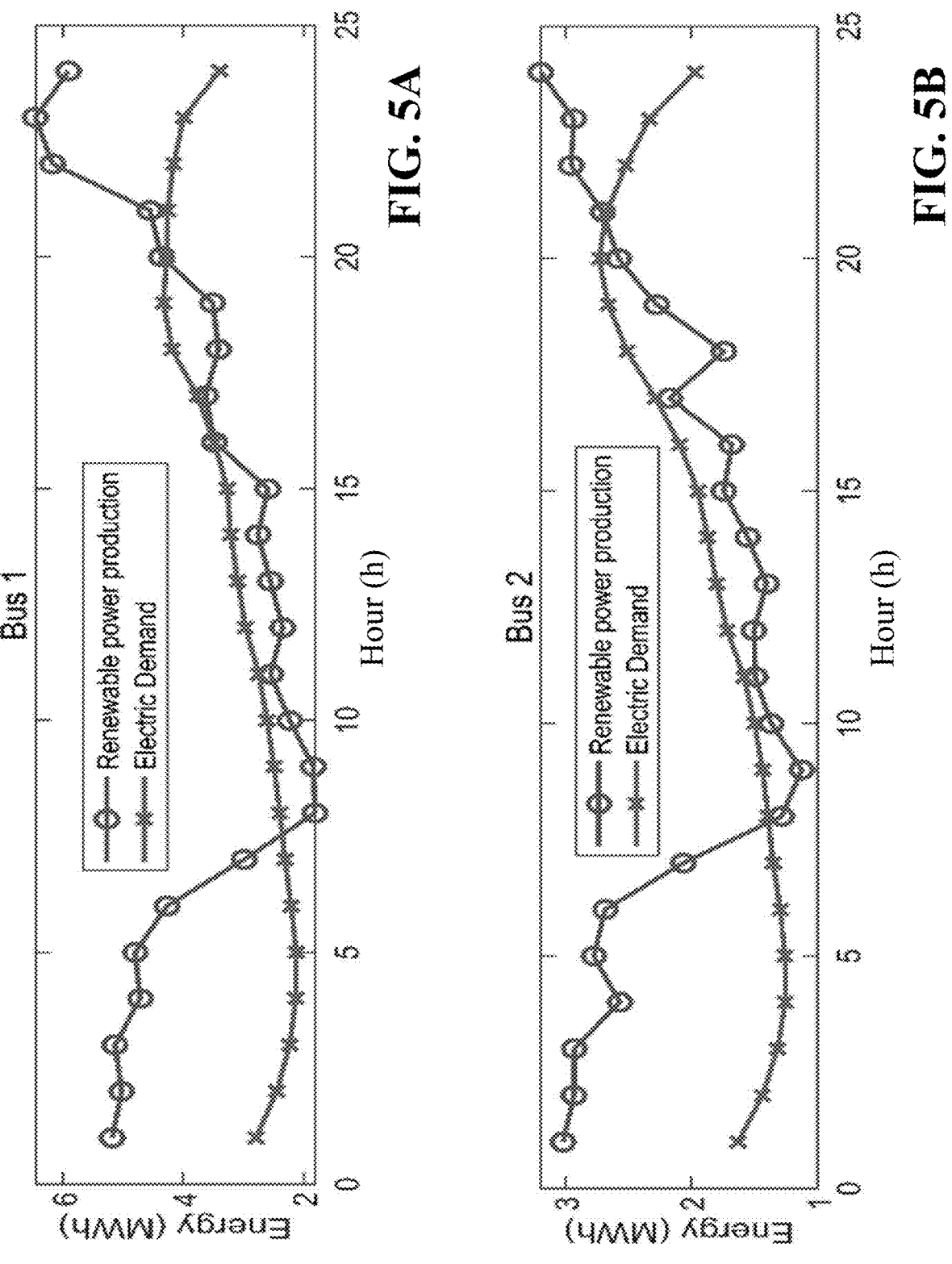
FIG. 5A, FIG. 5B and FIG. 5C are graphs illustrating the list of expected values of the renewable power productions and demands at three buses, according to some embodiments of the present disclosure.
Figures 5C, 6A:
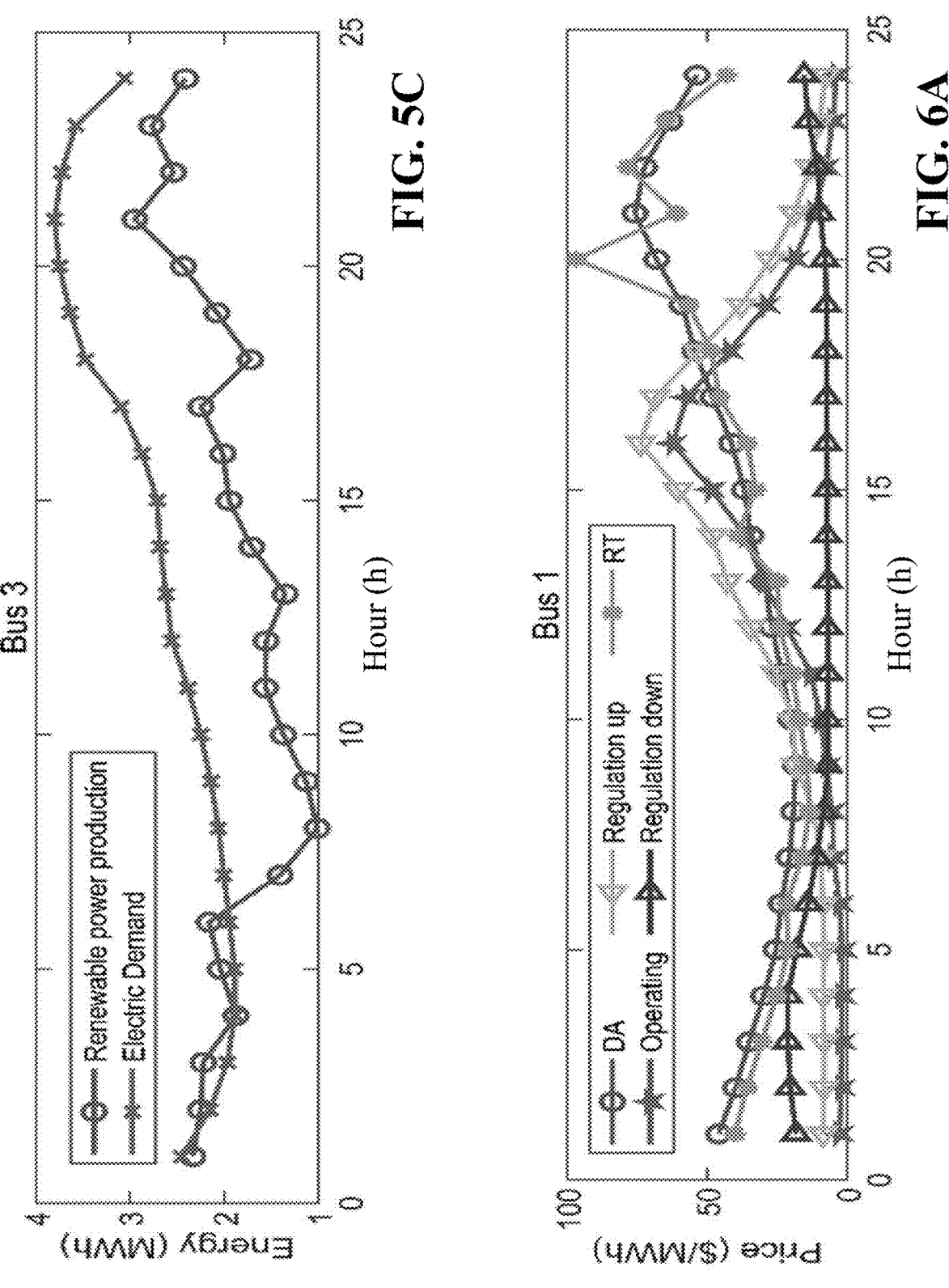
FIG. 6A, FIG. 6B and FIG. 6C are graphs illustrating the list of expected values of the energy and reserve prices at three buses, according to some embodiments of the present disclosure.

FIG. 5A, FIG. 5B and FIG. 5C are graphs illustrating the list of expected values of the renewable power productions and demands at three buses (bus 1 (FIG. 5A); bus 2 (FIG. 5B; and bus 3 (FIG. 5C), according to some embodiments of the present disclosure. For example, FIGS. 5A-5C show the expected values of the renewable power productions and demands.

Figures 6B, 6C:
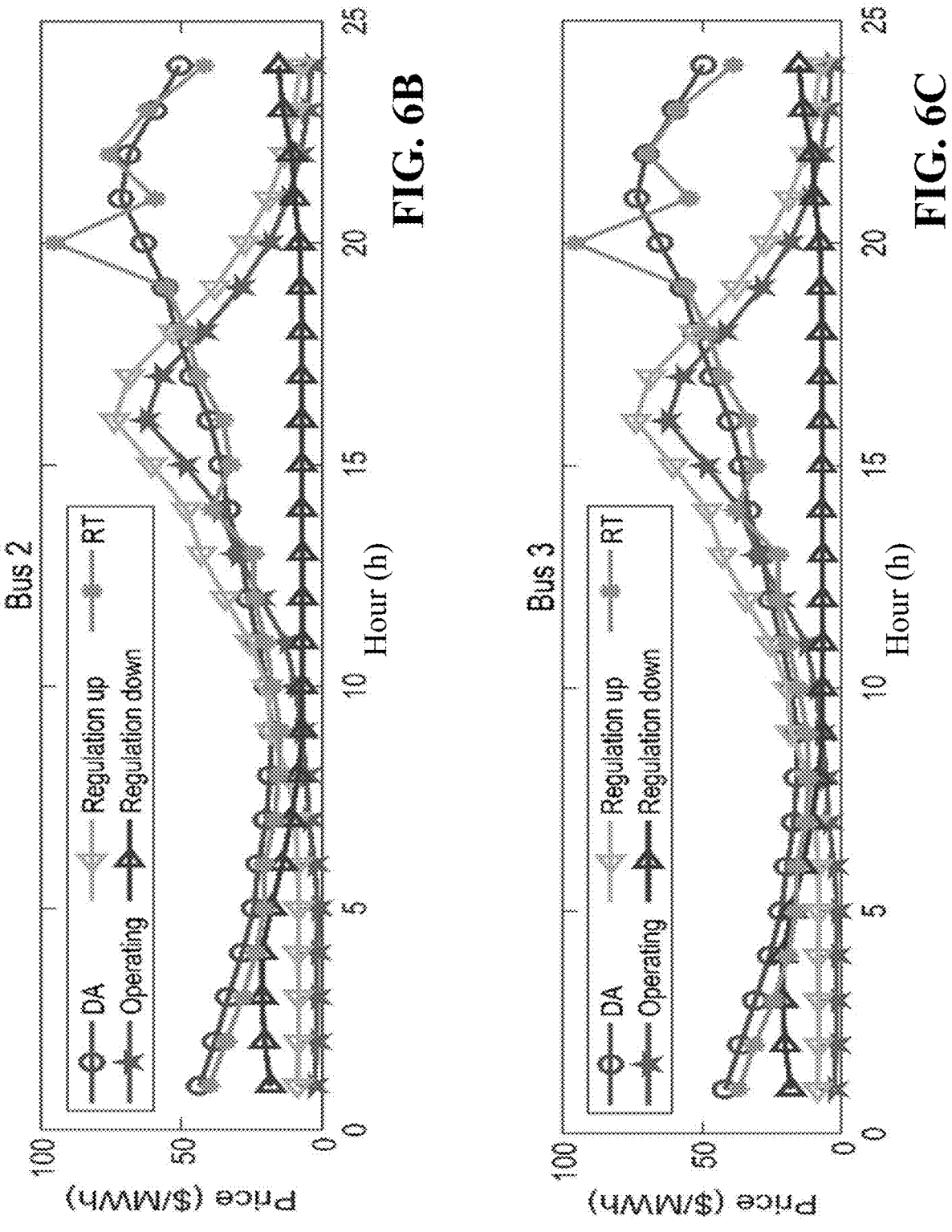

FIG. 6A, FIG. 6B and FIG. 6C are graphs illustrating the list of expected values of the energy and reserve prices at three buses, (bus 1 (FIG. 6A); bus 2 (FIG. 6B; and bus 3 (FIG. 6C)), according to some embodiments of the present disclosure. For example, FIGS. 6A-6C show the expected values of the energy and reserve prices.

Referring to FIGS. 5A-5C and FIGS. 6A-6C, as shown in FIG. 5A, the renewable power productions at Bus 1 are higher than those at the other two buses FIGS. 5B-5C on the next day, and renewable power productions at these three buses are more stochastic than the electric demands. FIGS. 6A-6C shows that the real-time energy prices are more volatile than the day-ahead energy prices, because the price spikes are more likely to occur in the real-time markets due to some unexpected events in the power systems, such as the power outages caused by some extreme weather events.

By solving the model (1)-(30) for the studied case, the results of the stochastic bidding strategies for one day are obtained.

Figures 7A, 7B:
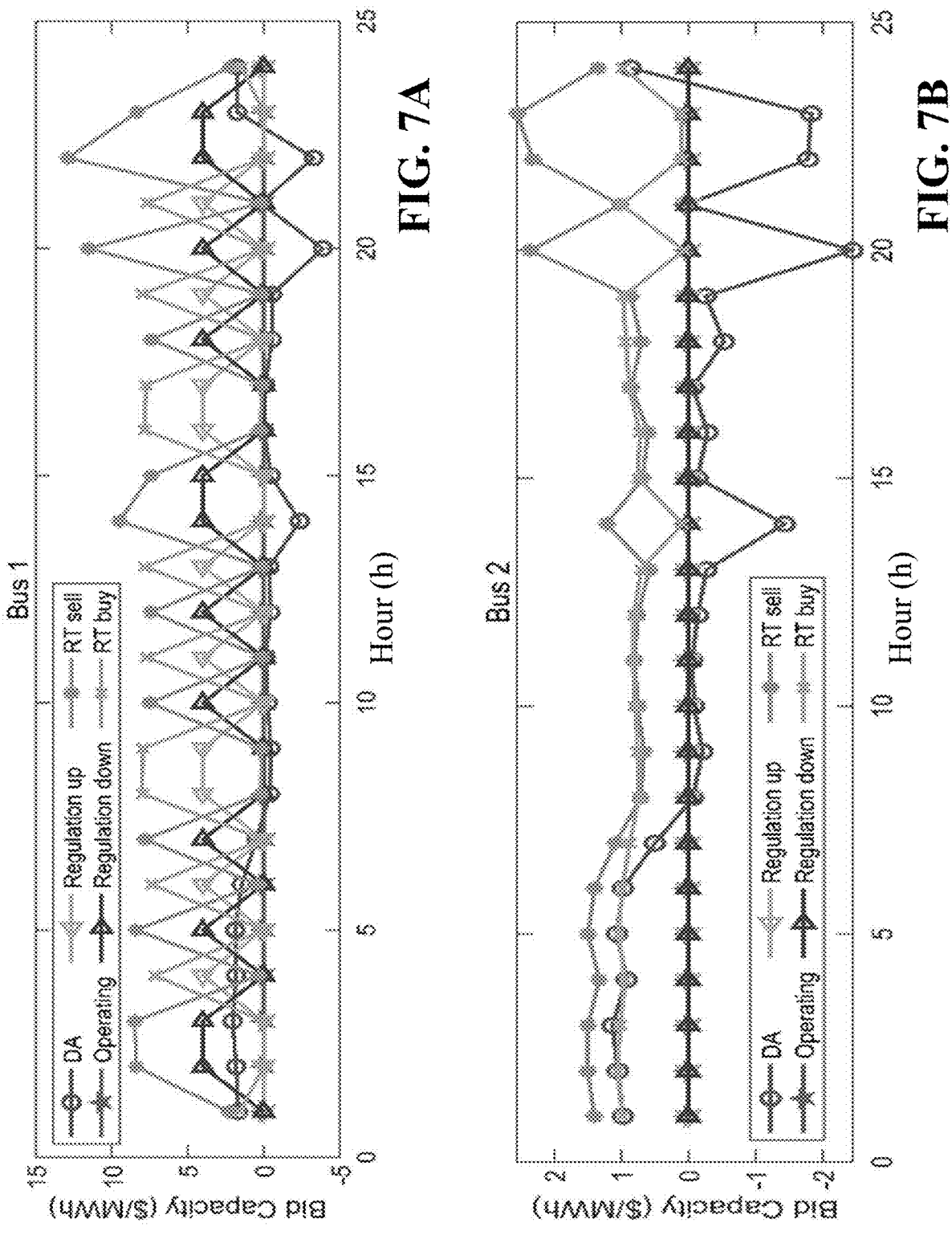
FIG. 7A, FIG. 7B and FIG. 7C are graphs illustrating the list of expected values of the energy and reserve bidding capacities of the virtual power plant, according to some embodiments of the present disclosure.
Figure 7C:
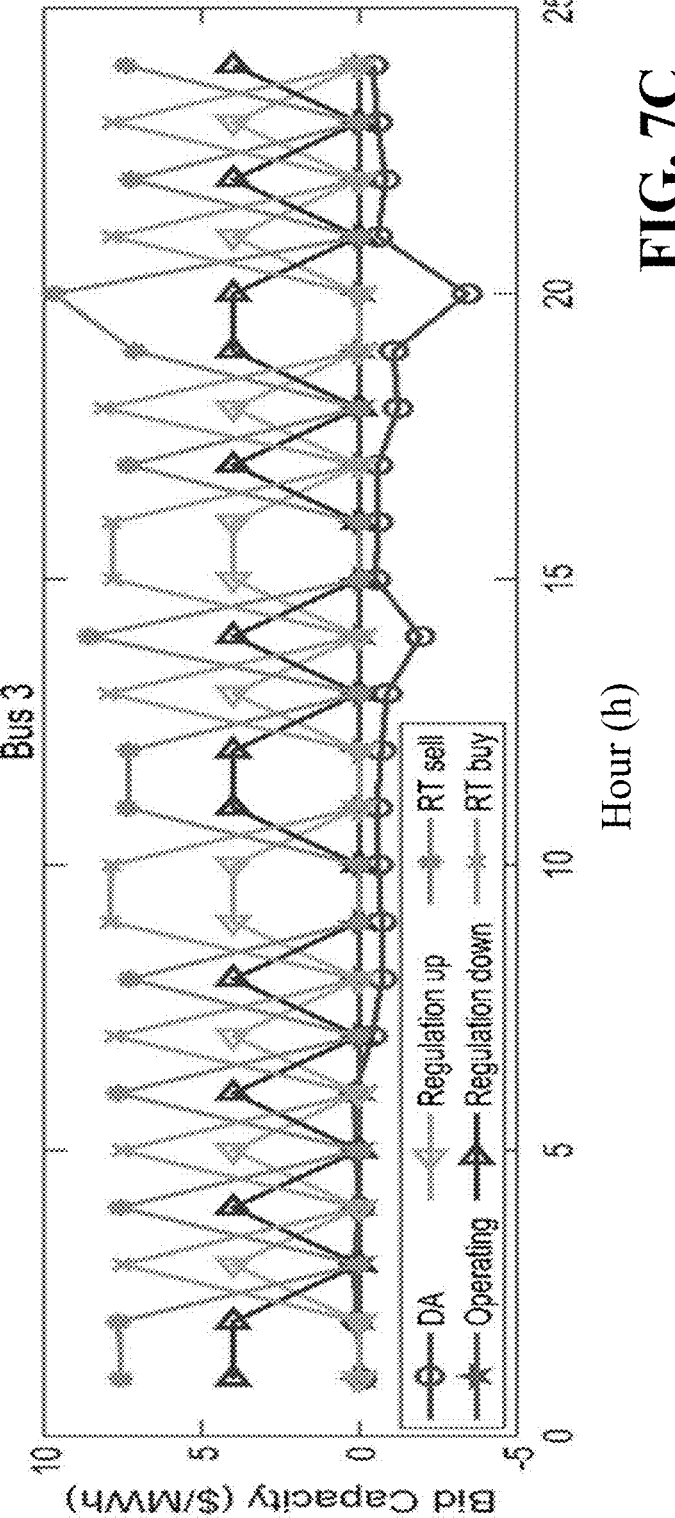

FIG. 7A, FIG. 7B and FIG. 7C are graphs illustrating the list of expected values of the energy and reserve bidding capacities of the virtual power plant, according to some embodiments of the present disclosure.

Figure 8:
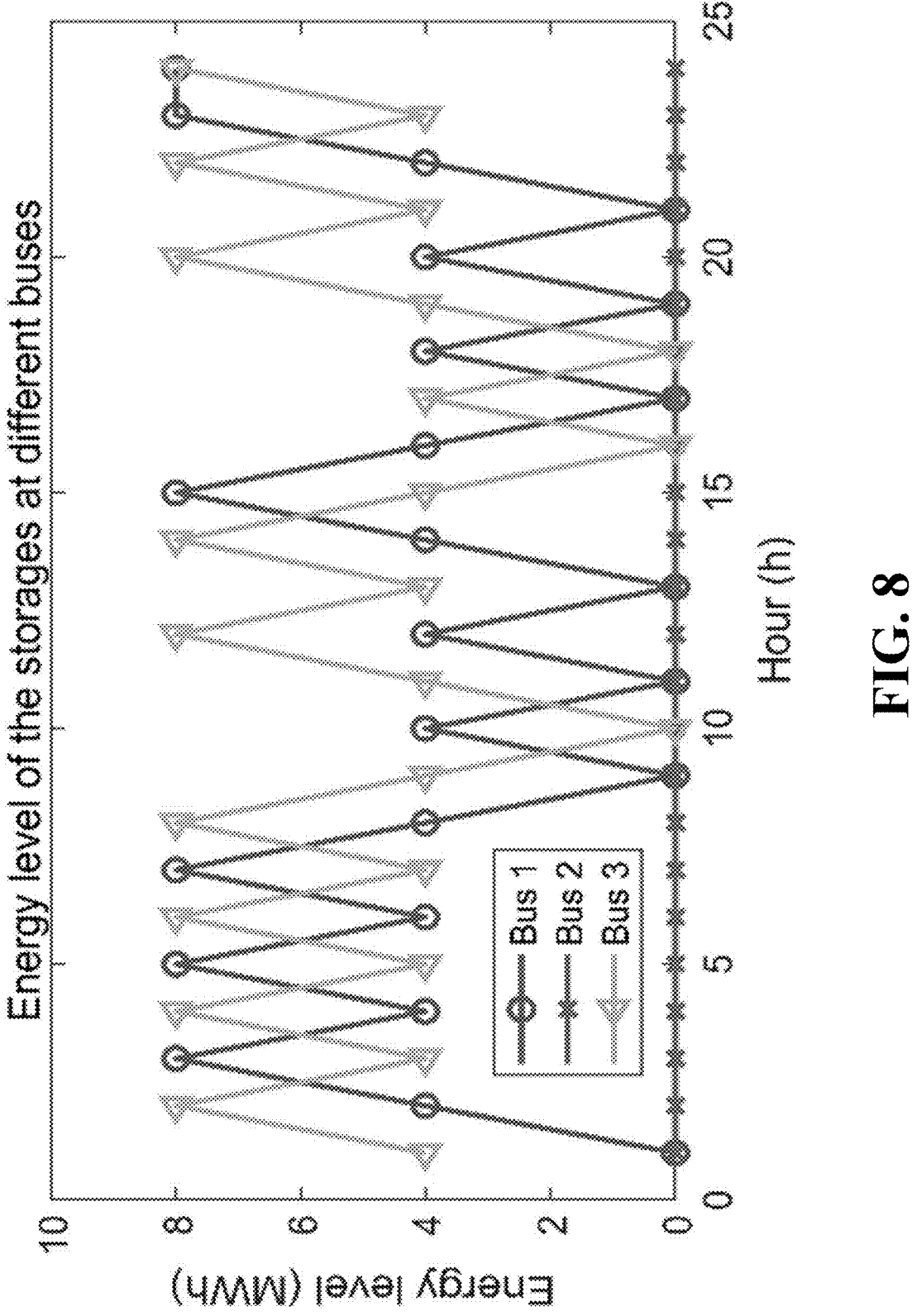
FIG. 8 is a graph illustrating a list of expected values of the energy levels of the energy storages at three buses, according to some embodiments of the present disclosure.

FIG. 8 is a graph illustrating a list of expected values of the energy levels of the energy storages at three buses, according to some embodiments of the present disclosure.

Referring to FIGS. 7A-7C and FIG. 8, the expected values of the bidding capacities and energy levels of the storages are provided, respectively. It is shown that even though the energy storages are initially located at Bus 3, the reserve bids are submitted at both Bus 1, and Bus 3, and the energy level of the storages at Bus 1 is positive. These results indicate one of the virtual power plant's energy storages is moved from Bus 3 to Bus 1, where renewable power productions are higher than those at Bus 2 and 3.

To further analyze the advantages of using mobile energy storages for the virtual power plant, the results of bidding strategy with the storages fixedly located at the initial buses are calculated by solving the model (1)-(30) and setting the delivery speed v to be zero.

FIG. 9 is a table illustrating the total expected profit and conditional values at risk of the virtual power plant obtained in Cases 1-3, according to some embodiments of the present disclosure. For example, FIG. 9 compares the total expected profit and conditional values at risk of the virtual power plant obtained by using different bidding strategies, where v=0 means the energy storages are located at the initial buses and cannot be moved on the next day.

FIG. 9 also shows that the total expected profit, $CVaR_{0.8}$ and $CVaR_{0.95}$ in Case 2 are $10, $500 and $849 higher than those in Case 1, respectively, which indicates the mobile energy storages can not only increase the expected profit, but also decrease the risk in the worst scenarios for the virtual power plant. Additionally, to study the impacts of the virtual power plant's risk preference on the bidding strategy, Case 3 is designed by setting $\beta_0$, $\beta_1$ and $\beta_2$ to be 0.95, 0.025 and 0.025, respectively. Compared to Case 1, the improvements of total expected profit, $CVaR_{0.8}$ and $CVaR_{0.95}$ in Case 3 are $18, $430 and $732, respectively, which indicates when the virtual power plant is less risk averse, the conditional values at risk improvements obtained by using the mobile energy storages are decreased.

FIG. 10 is a table illustrating the total expected profit and conditional values at risk of the virtual power plant obtained in Cases 2, 4 and 5, according to some embodiments of the present disclosure. For example, FIG. 10 shows that to demonstrate the effectiveness of using multiple conditional values at risk in the disclosed bidding strategy, Case 4 and 5 are designed by setting 61 and 62 to be zero, respectively, and the simulations results of Case 2, 4 and 5 are compared in FIG. 10. In Case 4, since 62 is set to be zero and $CVaR_{0.95}$ is not optimized in the stochastic optimization model, the $CVaR_{0.95}$ is $162 lower than that in Case 2; in Case 5, since $\beta_1$ is set to be zero and $CVaR_{0.8}$ is not optimized in the stochastic optimization model, the $CVaR_{0.8}$ is $101 lower than that in Case 2. Therefore, the simulation results in FIG. 10 show that the multiple risks related to different confidence levels can be optimized simultaneously by using the proposed bidding strategy. Additionally, the expected profit in Case 4 is the higher than that in Case 5, and it shows that maximizing the $CVaR_{0.8}$ does not decrease the total expected profit as much as maximizing the $CVaR_{0.95}$, because $CVaR_{0.8}$ is closer to the expected profit of all the scenarios than $CVaR_{0.95}$.

In summary, using the disclosed stochastic optimization model, we have generated a set of energy and reserve bidding strategies for the virtual power point with mobile energy storages, renewable energy sources and electric demands at multiple buses. The uncertainties faced by the virtual power point has been represented via scenarios, and multiple conditional values at risk with different confidence levels were maximized simultaneously considering the virtual power point's risk preference.

The above simulation results showed that the total expected profit was increased and the risks were decreased for the virtual power point by using the mobile energy storages instead of the stationary ones. Moreover, by using the proposed bidding strategy, multiple conditional values at risk can be maximized simultaneously in the model considering the virtual power point's risk preferences in the energy and reserve markets.

Figure 11A:
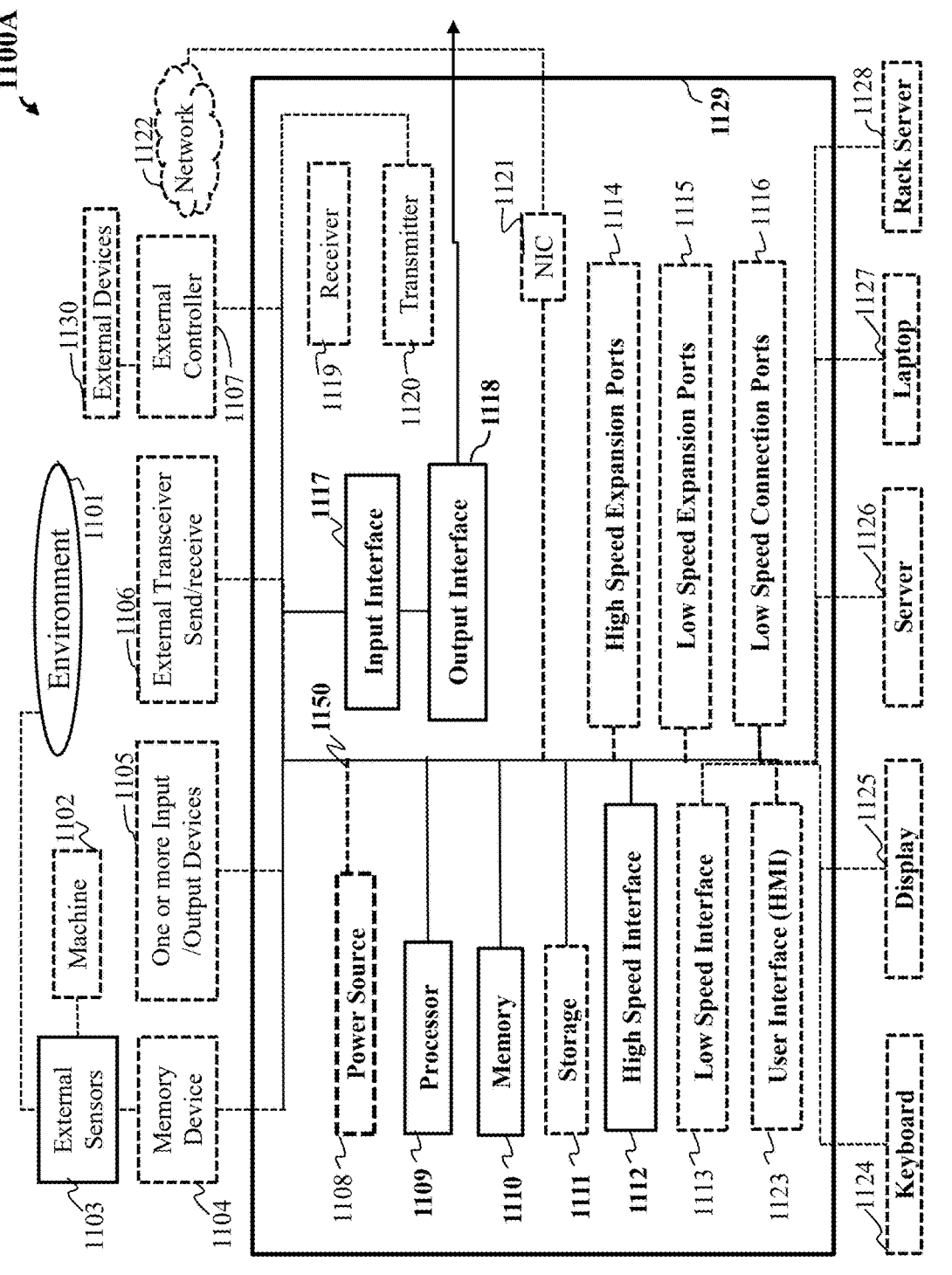
FIG. 11A is a schematic illustrating a computing apparatus that can be used to implement some techniques of the methods and systems, according to embodiments of the present disclosure.

FIG. 11A is a schematic illustrating by non-limiting example a computing apparatus 1100A that can be used to implement some techniques of the methods and systems, according to embodiments of the present disclosure. The computing device 1129 represents various forms of digital computers, such as laptops, desktops, workstations, personal digital assistants, servers, blade servers, mainframes, and other appropriate computers.

The computing device 1129 can include a power source 1108, a processor 1109, a memory 1110, a storage device 1111, all connected to a bus 1150. Further, a high-speed interface 1112, a low-speed interface 1113, high-speed expansion ports 1014 and low speed connection ports 1115, can be connected to the bus 1150. Also, a low-speed expansion port 1116 is in connection with the bus 1150. Contemplated are various component configurations that may be mounted on a common motherboard, by non-limiting example, 1130, depending upon the specific application. Further still, an input interface 1117 can be connected via bus 1150 to an external receiver 1106 and an output interface 1118. A receiver 1119 can be connected to an external transmitter 1107 and a transmitter 1120 via the bus 1150. Also connected to the bus 1150 can be an external memory 1104, external sensors 1103, machine(s) 1102 and an environment 1101. Further, one or more external input/output devices 1005 can be connected to the bus 1150. A network interface controller (NIC) 1121 can be adapted to connect through the bus 1150 to a network 1122, wherein data or other data, among other things, can be rendered on a third-party display device, third party imaging device, and/ or third-party printing device outside of the computer device 1129.

Contemplated is that the memory 1110 can store instructions that are executable by the computer device 1129, historical data, and any data that can be utilized by the methods and systems of the present disclosure. The memory 1110 can include random access memory (RAM), read only memory (ROM), flash memory, or any other suitable memory systems. The memory 1110 can be a volatile memory unit or units, and/or a non-volatile memory unit or units. The memory 1110 may also be another form of computer-readable medium, such as a magnetic or optical disk.

Still referring to FIG. 11A, a storage device 1111 can be adapted to store supplementary data and/or software modules used by the computer device 1129. For example, the storage device 1111 can store historical data and other related data as mentioned above regarding the present disclosure. Additionally, or alternatively, the storage device 1111 can store historical data similar to data as mentioned above regarding the present disclosure. The storage device 1011 can include a hard drive, an optical drive, a thumb-drive, an array of drives, or any combinations thereof. Further, the storage device 1111 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1109), perform one or more methods, such as those described above.

The system can be linked through the bus 1150 optionally to a display interface or user Interface (HMI) 1123 adapted to connect the system to a display device 1125 and keyboard 1124, wherein the display device 1125 can include a computer monitor, camera, television, projector, or mobile device, among others.

Still referring to FIG. 11A, the computer device 1129 can include a user input interface 1117 adapted to a printer interface (not shown) can also be connected through bus 1150 and adapted to connect to a printing device (not shown), wherein the printing device can include a liquid inkjet printer, solid ink printer, large-scale commercial printer, thermal printer, UV printer, or dye-sublimation printer, among others. Also, an external controller or multiple controllers 1107 can be connected external devices 1130.

The high-speed interface 1112 manages bandwidth-intensive operations for the computing device 1000A, while the low-speed interface 1113 manages lower bandwidth-intensive operations. Such allocation of functions is an example only. In some implementations, the high-speed interface 1112 can be coupled to the memory 1110, a user interface (HMI) 1123, and to a keyboard 1124 and display 1125 (e.g., through a graphics processor or accelerator), and to the high-speed expansion ports 1114, which may accept various expansion cards (not shown) via bus 1150. In the implementation, the low-speed interface 1113 is coupled to the storage device 1111 and the low-speed expansion port 1115, via bus 1150. The low-speed expansion port 1115, which may include various communication ports (e.g., USB, Bluetooth, Ethernet, wireless Ethernet) may be coupled to one or more input/output devices 1105, and other devices a keyboard 1124, a pointing device (not shown), a scanner (not shown), or a networking device such as a switch or router, e.g., through a network adapter.

Still referring to FIG. 11A, the computing device 1129 may be implemented in a number of different forms, as shown in the figure. For example, it may be implemented as a standard server 1126, or multiple times in a group of such servers. In addition, it may be implemented in a personal computer such as a laptop computer 1127. It may also be implemented as part of a rack server system 1128. Alternatively, components from the computing device 1129 may be combined with other components in a mobile device, such as a mobile computing device. Each of such devices may contain one or more of the computing device 1129 and the mobile computing device, and an entire system may be made up of multiple computing devices communicating with each other.

Figure 11B:
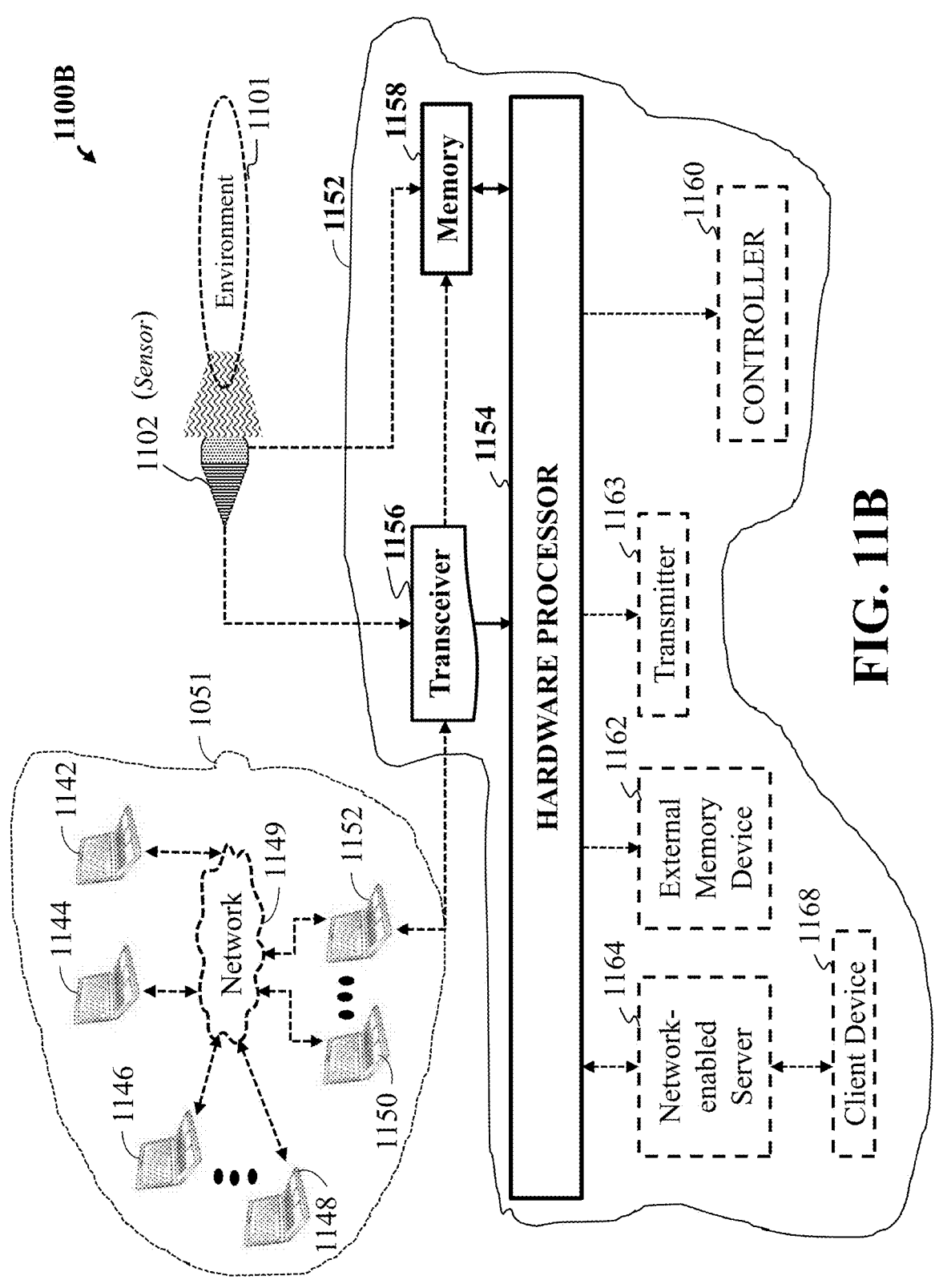
FIG. 11B is a block diagram illustrating some components that can be used for implementing the systems and methods, according to embodiments of the present disclosure.

FIG. 11B is a block diagram illustrating some computing devices that can be used for implementing the systems and methods that includes a network overview, according to embodiments of the present disclosure. An example of a network for implementing a VPP control system 1051 can include a central computer 1142, i.e. may be more than one central computer and a network 1149 communicatively connected to networked computers 1144, 1146, 1148, 1150 and 1152. The central computer 1142 can manage and operate 1051 the VPP, and by non-limiting example, be associated, by-non-limiting example, with an operator that manages a virtual power plant that produces or consumes electricity associated with the networked computers 1144, 1146, 1148, 1150 and 1152. The central computer 1142 can be associated with one or more generations in an VPP, one or more electric demands, one or more energy storage devices. Also, the network 1149 may, by non-limiting example, include computing hardware connected with an electrical device, a power generator, or a storage device etc., wherein the computing hardware may include integrated circuits that are structured to perform the systems and method of the present disclosure. The central computer 1142 can receive requests from those computing devices associated with electric demands or consumption which can be computing devices 1146, 1148, and receive requests from those computing devices associated with power generations which can be computing devices 1144, 1150 and 1152. The operator or central computer 1142 can then compute a value at which the electricity is to be sent, and transmit the sent value to the computing devices 1144, 1146, 1148, 1150 and 1152. When the sent value refers to an actual price of the electricity, i.e. "clearing price", of the current time interval or of the next upcoming time interval. Noted is that the time intervals can vary, for example, 60 minutes, 30 minutes, 15 minutes, at 10-minute periods or 5-minute periods. The central computer 142 can be used by the computing devices 1144, 1146, 1148, 1150 and 1152 to compute a bid for power production. The central computer 1142 can also have other data such as future market data that can be transmitted to the networked computers. Further, the central computer 1142 can be accessed over the network 1049, which can be used as a Local Area Network ("LAN") using wired networking (e.g., the Ethernet IEEE standard 802.3 or other appropriate standard) or wireless networking.

Still referring to FIG. 11B, 1100B includes a computing device 1152 (which is computing device 1152, which can be a controller such as a transactive controller or active controller), that includes a hardware processor 1154, in communication with a transceiver 1156. The transceiver 1156 can be in communication with a sensor 1102 or sensors, that collects data from an environment 1101 that is related to an area the electrical device operates. The sensor 1102 converts an input into a signal, which can be stored in memory 1158.

The hardware processor 1154 in communication with a computer storage memory, i.e. memory 1158, such that the memory 1158 includes stored data, including algorithms, instructions and other data, that can be implemented by the hardware processor 1154. The computing device 1152 can further include a controller 1160, external memory device 1162, network-enabled server 1164 and a client device 1168.

It is contemplated the hardware processor 1154 can include two or more hardware processors depending upon the requirements of the specific application, wherein the processors can be either internal or external. Certainly, other components may be incorporated with method 1100B including output interfaces and transceivers, among other devices.

It is possible the network 1149 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the system 1100B. Each may comprise a single device or multiple devices cooperating in a distributed environment. Further, system 1100B can include one or more data source(s) (not shown). The data source(s) can comprise data resources for determining bidding strategies. The data provided by data source(s) may include historical bids and cleared prices and quantities, and historical aggregate renewable generations and aggregate energy consumptions.

Features

According to aspects of the present disclosure, a system for allocating electrical energy that includes distributing and receiving electrical energy using a mobile electrical energy storage (MEES) system at locations of a power supplier in a market-based resource allocation system by a market participant. Wherein a transceiver receives data including past data and other data, and a memory with executable programs and stored data. The system comprising a processor connected to the transceiver and the memory. The processor is configured to determine allocating amounts of the electrical energy for the MEES system and scheduling the amounts of the electrical energy of the MEES system for each time interval for all time intervals for an upcoming operating time period based on a set of uncertain parameters using an optimization model by calculate an objective function of the optimization model based on a subset of the uncertain parameters including energy and reserve market prices, renewable energy production and electric energy demands. Identify periodic and aggregate constraints, and update the objective function using a subset of the identified periodic and aggregate constraints. While optimizing the objective function for a value hierarchy associated with energy and reserve bidding scenarios for the market participant and delivery scheduling for the MEES system based upon the stored market participant risk preferences. Control the scheduling of the MEES system between the locations of the energy storage devices of the power supplier, according to: (a) the distribution of the amount of the electrical energy to the locations of energy storage devices of the power supplier for discharging; and (b) the receiving of the amount of the electrical energy for the MEES system at the locations of the energy storage devices of the power supplier for charging the MEES system, in accordance with the determined schedule of the MEES system and the allocation of the distribution and receiving amounts of electrical energy from the updated objective function. Wherein the MEES system is charged or discharged in accordance with the determined schedule of the MEES system and the allocation of the distribution and receiving amounts of electrical energy for the upcoming time intervals. Contemplated is that aspects below can be combined individually or in combination to create different embodiments of the present disclosure. For example, one aspect can create an embodiment or two or more aspects can create an embodiment, such that many embodiments are contemplated based on the number aspects presented below.

An aspect of the present disclosure is that the MEES system includes one or a combination of vehicles, trains, planes or boats, to transport the electrical energy at the locations of the power supplier for allocation.

Another aspect of the present disclosure can include that the optimization model is a stochastic optimization model formulated as a mixed integer linear programming problem.

Another aspect of the present disclosure can include that the value hierarchy associated with energy and reserve bidding scenarios are based on expected profits gained from energy and reserve markets by the market participant which are determined as expected revenues minus associated MEES system costs, wherein the revenues are selected from a group including: a day-ahead market revenue, a real-time market revenue, an operating reserve market revenue, a regulation up reserve revenue, and a regulation down reserve revenue; wherein the MEES system costs associated with market revenues are selected from the group including: an energy storage operation cost, an energy storage delivery cost; and an energy storage installation cost.

It is possible that an aspect can be that the subset of uncertain parameters include: day-ahead energy price, real-time energy price, operating reserve price, regulation up reserve price, regulation down reserve price, renewable energy production, and electric demands; wherein a set of possible scenarios with associated occurring frequencies are used to represent the distributions of uncertain parameters.

Another aspect can include that for each time interval of the upcoming operating time period, scenarios are determined for the subset of uncertain parameters using regression analysis or machine learning of past data of the subset of uncertain parameters, or directly using corresponding values of the subset of uncertain parameters at a same time interval of a latest past days, obtained from the stored past data.

Yet another aspect can include that the power supplier is one or a combination of, aggregate electric load, aggregate renewable resource, and mobile storage that connects with a power grid at one or more locations within the power grid.

An aspect can include that the power supplier participates in power production bidding for multiple energy and reserve markets, including day-ahead energy market, real-time energy market, operation reserve market, regulation up reserve market, and regulation down reserve market.

Another aspect can include that the conditional values at risk are associated with one or more market participant confidence levels, such that each market participant confidence level is provided by the market participant, wherein if there are more than one market participants, then the conditional values at risk can be associated with different confidence levels.

Yet another aspect can include that the subset of periodic constraints and the aggregate constraints include: (a) power to be balanced at each location for each time interval of the upcoming time period, such that a total power sold to the energy and reserve markets for the time interval is equal to real-time renewable power productions and storage discharged powers minus electric demand consumption and storage charged powers at the time interval; (b) maximum and minimum day-ahead bidding capacities limited by the power supplier's total generation and demand capacities; (c) reserve bidding capacities limited by charging and discharging power capacities of the MEES system. (d) Wherein the MEES system includes mobile energy storage vehicles, such that each mobile electrical energy storage vehicle can be located at only one location for one time interval; (e) an energy level of each mobile electrical energy storage vehicle is determined based on an energy level of the mobile electrical energy storage vehicle at a last location, and charging and discharging activities occurring after the mobile electrical energy storage vehicle moves to a next location; (f) storage charging and discharging power capacities of the mobile electrical energy storage vehicle are constrained by a delivery status of the power supplier energy storage device at the next location; and (g) during a delivery process of the mobile electrical energy storage vehicle traveling to the next location, the mobile electrical energy storage vehicle cannot charge or discharge electrical energy, and a length of time for the delivery process is determined by a distance between two consecutive locations and a carrier delivery speed.

Notations:

a). Indexes and Sets

| t: | The index of time periods, running from 1 to T |
|---|---|
| w: | The index of scenarios, running from 1 to W |
| m, n. | The Index of buses, running from 1 to N |
| i: | The Index of RESs, running from 1 to I |
| j: | The Index of electric demands, running from 1 to J |
| k: | The Index of mobile energy storages, running from 1 to K |
| s: | The index of CVaRs, running from 1 to S |
| $\Psi_n^I$: | The set of the RESs located at bus n |
| $\Psi_n^J$: | The set of the demands located at bus n |
| $\Xi$ | The set of the decision variables of the proposed optimization model | b). Variables

| $\pi_w^{EM}$: | The total profit in DA and RT energy market in scenario w ($). |
|---|---|
| $\pi_w^{OR}$: | The total profit in the operating reserve market in scenario w ($). |
| $\pi_w^{reg}$: | The total profit in the regulation reserve market in scenario w ($). |
| $C_w^{MES}$: | The total energy storage operation cost in scenario w ($). |
| $C_{deli}$: | The total labor and fuel cost of delivering the energy storages ($) |
| $C_{inst}$: | The total labor cost of installing the energy storages ($). |
| $E_{kntw}$: | The RT energy level of the storages k at bus n in time t in scenario w (MWh). |
| $P_{kntw}^{dis,RT}$: | The RT discharge power of energy storage k at bus n in time t in scenario w (MW). |

| $P_{kntw}^{ch,RT}$: | The RT charge power of energy storage k at bus n in time t in scenario w (MW). |
|---|---|
| $E_{ktw}$: | The RT energy level of the storages k in time t in scenario w (MWh). |
| $P_{ktw}^{dis,RT}$: | The RT discharge power of energy storage k in time t in scenario w (MW). |
| $P_{ktw}^{ch,RT}$: | The RT charge power of energy storage k in time t in scenario w (MW). |
| $z_{kn}$: | Binary variable, which is equal to 1 if the energy storage k is delivered to bus n and 0 otherwise. |
| $x_{ntw}^{ES}$: | Binary variable, which is equal to 1 if the energy storages at bus n are charging and 0 if discharging in time t in scenario w. |
| $y_{ntw}^{RT}$: | Binary variable, which is equal to 1 if the RT power deviation of the VPP is positive at bus n in and 0 otherwise in time t in scenario w. |
| $P_{nt}^{DA}$: | The power bid in DA energy market at bus n in time t (MW). |
| $P_{nt}^{OR}$: | The operating reserve bid at bus n in time t (MW). |
| $P_{nt}^{reg,up}$: | The regulation up reserve bid at bus n in time t (MW). |
| $P_{nt}^{reg,down}$: | The regulation down reserve bid at bus n in time t (MW). |
| $P_{ntw}^{RT+}$: | The positive RT deviation at bus n in time t in scenario w (MW). |
| $P_{ntw}^{RT-}$: | The negative RT deviation at bus n in time t in scenario w (MW). | c). Parameters:

| $\Delta t$: | The duration of time period. |
|---|---|
| $\lambda_{ntw}^{DA}$: | The DA electricity price at bus n in time t in scenario w ($/MWh). |
| $\lambda_{ntw}^{RT}$: | The RT electricity price at bus n in time t in scenario w ($/MWh). |
| $\lambda_{ntw}^{OR}$: | The operating reserve price at bus n in time t in scenario w ($/MWh). |
| $\lambda_{ntw}^{reg,up}$: | The regulation up price at bus n in time t in scenario w ($/MWh). |
| $\lambda_{ntw}^{reg,down}$: | The regulation down price at bus n in time t in scenario w ($/MWh). |
| $P_{itw}^{RES}$: | Renewable energy production for unit i in time t in scenario w (MW). |
| $P_{jtw}^{DEM}$: | Electric demand for unit j in time t in scenario w (MW). |
| $P^{DA,min}$: | Lower bound of the bidding capacity in the DA energy market for the VPP |
| $P^{DA,max}$: | Upper bound of the bidding capacity in the DA energy market for the VPP |
| $pr_w$ | Probability of a scenario w. |

-continued

| | |
|---|---|
| $\eta_k^{ES}$: | The charging and discharging efficiency of energy storage k. |
| $\eta_{nt}^{OR}$: | The percentage of the deployed operating reserves at bus n in time t |
| $\eta_{nt}^{reg,up}$: | The percentage of the deployed regulation up reserves at bus n in time t |
| $\eta_{nt}^{reg,down}$: | The percentage of the deployed regulation down reserves at bus n in time t |
| $E_k^{K,max}$: | The maximum energy capacity for energy storage k (MWh). |
| $P_k^{K,max}$: | The maximum power capacity for energy storage k (MW). |
| $C_k$: | Operation cost per MW for energy storage k ($/MW). |
| $E_k^{K,0}$: | The initial energy level for energy storage k (MWh). |
| $z_{kn}^0$: | Binary parameter, which is equal to 1 if the energy storage k is located at bus n at the beginning and 0 otherwise. |
| DC: | Fuel and labor cost per km for delivering the mobile energy storage ($/km). |
| $d_{mn}$: | The delivery distance between bus m and n, which is 0 if m = n (km) |
| v: | Drive speed of the carrier of the energy storages (km/h). |
| $f_{mnt}$: | Binary parameter, which is equal to 0 if the energy storage is on the way of being delivered from bus m to bus n and 1 otherwise. |
| IC: | Labor cost for installing an energy storage after being delivered to another bus on the next day ($). |
| $v_{mn}$: otherwise. | Binary parameter, which is equal to 0 if m = n and 1 |
| M: | A large enough constant |
| $\beta_0$: | Weight assigned to the total expected profit of the VPP in the objective function of the proposed optimization model. |
| $\alpha_s$: | The confidence level for the sth CVaR. |
| $\beta_s$: | Risk aversion degree for the sth CVaR with confidence level $\alpha_s$ |

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks. A processor, by non-limiting example can be computer hardware, i.e. a logic circuitry that responds to and processes the basic instructions that drive a computer to implement the algorithm described in present disclosure.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for allocating electrical energy using a mobile electrical energy storage (MEES) system, a renewable generator, and a local load demand at locations of a virtual power plant (VPP) in a resource allocation system managing contributions to day-ahead and real-time power balance and real-time reliability reserves of a power grid by the VPP, the system comprising:

a transceiver configured to receive information including past energy and reserve market data, past renewable generation and consumption data related to the VPP, and upcoming weather data;

a memory configured to store executable instructions; and a processor configured to execute the instructions to:

generate event data corresponding to a set of uncertain events for risk management of the VPP, based on the received information, wherein the event data comprises a set of uncertain parameters related to i.) energy and reserve rates and ii.) amounts of renewable production and load consumption in the VPP;

determine an optimal delivery and operation schedule for the MEES system for the upcoming time period, based on maximization of a weighted sum of expected rewards gained from energy and reserve contributions by the VPP and a plurality of conditional values at risk defined by the event data, wherein the optimal operation and delivery schedule includes allocation amounts of the electrical energy for the MEES system and contributions to energy balances and reserves of the power grid by the VPP for each time interval of the upcoming time period;

control delivery and operation of the MEES system between the locations of the VPP, according to (a) a first distribution of the allocation amounts of the electrical energy to the locations of the VPP for discharging for each time interval of the upcoming time period, and (b) a second distribution of the allocation amounts of the electrical energy for the MEES system at the locations of the VPP for charging the MEES system for each time interval of the upcoming time period; and charge or discharge the MEES system in accordance with the optimal delivery and operation schedule of the MEES system.

2. The system of claim 1, wherein each of the locations includes one or a combination of an energy storage device, a renewable resource or an electrical load, wherein the past energy and reserve market data includes past energy and reserve market clearing price and quantity data from independent system operator (ISO).

3. The system of claim 1, wherein the MEES system includes one or a combination of vehicles, trains, planes or boats, to transport one or more storage devices configured to transport stored electrical energy to the locations and receive electrical energy from one or a combination of an energy storage device, a renewable resource, or the power grid.

4. The system of claim 1, wherein to determine the optimal delivery and operation schedule for the MEES system for the upcoming time period, the processor is configured to solve a stochastic optimization model formulated as a mixed integer linear programming problem of the uncertain parameters.

5. The system of claim 1, wherein the uncertain parameters include: day-ahead energy price, real-time energy price, operating reserve price, regulation up reserve price, regulation down reserve price, renewable energy production, and electric demands; wherein a set of possible scenarios with associated occurring frequencies are used to represent distributions of the uncertain parameters.

6. The system of claim 5, wherein for each time interval of the upcoming time period, scenarios are determined for a subset of the uncertain parameters using regression analysis or machine learning of past data of the subset of the uncertain parameters, or directly using corresponding values of the subset of the uncertain parameters at a same time interval of a latest past days, obtained from the received information.

7. A method for allocating electrical energy using a mobile electrical energy storage (MEES) system, a renewable generator, and a local load demand at locations of a virtual power plant (VPP) in a resource allocation system managing contributions to day-ahead and real-time power balance and real-time reliability reserves of a power grid by the VPP, the method comprising:

receiving information including past energy and reserve market data, and other past renewable generation and consumption data related to the VPP, and upcoming weather data;

generating event data corresponding to a set of uncertain events for risk management of the VPP, based on the received information, wherein the event data comprises a set of uncertain parameters related to i.) energy and reserve rates and ii.) amounts of renewable production and load consumption in the VPP;

determining an optimal delivery and operation schedule for the MEES system for the upcoming time period, based on maximization of a weighted sum of expected rewards gained from energy and reserve contributions by the VPP and a plurality of conditional values at risk defined by the event data, wherein the optimal operation and delivery schedule includes allocation amounts of the electrical energy for the MEES system and contributions to energy balances and reserves of the power grid by the VPP for each time interval of the upcoming time period;

controlling delivery and operation of the MEES system between the locations of the VPP, according to (a) a first distribution of the allocation amounts of the electrical energy to the locations of the VPP for discharging for each time interval, and (b) a second distribution of the allocation amounts of the electrical energy for the MEES system at the locations of the VPP for charging the MEES system for each time interval of the upcoming time period and charging or discharging the MEES system in accordance with the optimal delivery and operation schedule of the MEES system.

8. The method of claim 7, wherein the uncertain parameters include: day-ahead energy price, real-time energy price, operating reserve price, regulation up reserve price, regulation down reserve price, renewable energy production, and electric demands; wherein a set of possible scenarios with associated occurring frequencies are used to represent distributions of the uncertain parameters, and wherein for each time interval of the upcoming time period, scenarios are determined for a subset of the uncertain parameters using regression analysis or machine learning of past data of the subset of uncertain parameters, or directly using corresponding values of the subset of the uncertain parameters at a same time interval of a latest past days, obtained from the received information.

* * * * *